(12) United States Patent
Kuroda et al.

(10) Patent No.: US 8,218,247 B2
(45) Date of Patent: Jul. 10, 2012

(54) ZOOM LENS AND IMAGE PICKUP DEVICE

(75) Inventors: Daisuke Kuroda, Kanagawa (JP); Makoto Kanai, Tokyo (JP); Takumi Matsui, Tokyo (JP); Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 328 days.

(21) Appl. No.: 12/591,253

(22) Filed: Nov. 13, 2009

(65) Prior Publication Data
US 2010/0123959 A1    May 20, 2010

(30) Foreign Application Priority Data
Nov. 19, 2008  (JP) .................... 2008-295877

(51) Int. Cl.
*G02B 15/14*    (2006.01)
(52) U.S. Cl. .................................... 359/689
(58) Field of Classification Search .......... 359/784
See application file for complete search history.

(56) References Cited

U.S. PATENT DOCUMENTS
7,145,732 B2 * 12/2006 Matsusaka et al. ......... 359/689
2009/0303612 A1 * 12/2009 Fukuta et al. ............... 359/689

FOREIGN PATENT DOCUMENTS

| | | | |
|---|---|---|---|
| JP | 2004-013169 | A | 1/2004 |
| JP | 2005-258067 | A | 9/2005 |
| JP | 2005-316333 | A | 11/2005 |
| JP | 2006-011096 | A | 1/2006 |
| JP | 2006-065182 | A | 3/2006 |
| JP | 2006-113554 | A | 4/2006 |
| JP | 2006-194974 | A | 7/2006 |
| JP | 2006-220715 | A | 8/2006 |
| JP | 2007-025373 | A | 2/2007 |
| JP | 2007-121459 | A | 5/2007 |
| JP | 2007-140359 | A | 6/2007 |
| JP | 2007-212636 | A | 8/2007 |
| JP | 2008-203449 | A | 9/2008 |

OTHER PUBLICATIONS

Japanese Office Action issued Aug. 26, 2010 for corresponding Japanese Application No. 2008-295877.

* cited by examiner

*Primary Examiner* — Joseph P Martinez
(74) *Attorney, Agent, or Firm* — Rader Fishman & Grauer, PLLC

(57) ABSTRACT

Disclosed herein is a zoom lens formed by arranging a first lens group having a negative refractive power, a second lens group having a positive refractive power, and a third lens group having a positive refractive power in order from an object side to an image side, wherein at a time of varying power from a wide-angle end to a telephoto end, the first lens group is moved and the second lens group is moved to the object side integrally with a diaphragm such that an air interval between the first lens group and the second lens group is decreased and such that an air interval between the second lens group and the third lens group is increased.

8 Claims, 19 Drawing Sheets

------ RADIUS OF CURVATURE OF CENTRAL PART
—·—·— RADIUS OF CURVATURE OF PERIPHERAL PART

——— LUMINOUS FLUX AT WIDE-ANGLE END
- - - - - - LUMINOUS FLUX AT TELEPHOTO END

------- RADIUS OF CURVATURE OF CENTRAL PART
—·—·— RADIUS OF CURVATURE OF PERIPHERAL PART

ZOOM LENS AND IMAGE PICKUP DEVICE

BACKGROUND OF THE INVENTION

1. Field of the Invention

The present invention relates to a zoom lens and an image pickup device, and particularly to a technical field of a miniaturized higher-performance zoom lens suitable for a photographing optical system of digital input-output devices such as a digital still camera, a digital video camera and the like and an image pickup device using the zoom lens.

2. Description of the Related Art

Image pickup devices using a solid-state image pickup element such as a digital still camera and the like have recently been spread. With the spread of such image pickup devices such as a digital still camera and the like, even higher image quality is desired. In a digital still camera or the like, in particular, there is a desire for a photographing lens, especially a zoom lens, that has excellent image forming performance and which lens is compatible with a solid-state image pickup element having the large number of pixels.

There is also an increasing desire for a wider angle of view as well as higher image quality as described above, and there is a desire for a small zoom lens having a high variable power ratio and a wide angle of view such for example as a half angle of view of more than 38°.

There are many kinds of zoom lenses for digital still cameras. However, as a lens type suitable for achieving a reduced size and a wider angle of view, a three-group zoom lens is known which zoom lens is formed by arranging a first lens group having a negative refractive power, a second lens group having a positive refractive power, and a third lens group having a positive refractive power in order from an object side to an image side (see for example Japanese Patent Laid-Open Nos. 2004-13169, 2006-113554, 2007-212636 and 2007-140359, hereinafter referred to as Patent Documents 1 to 4, respectively).

In the zoom lenses described in Patent Document 1 and Patent Document 2, a wider angle of view is achieved by forming the first lens group by three lenses.

In the zoom lenses described in Patent Document 3 and Patent Document 4, miniaturization is achieved by forming the first lens group by two lenses. In the zoom lens described in Patent Document 4, in particular, miniaturization is achieved by forming the first lens group by two lenses and further actively bringing about distortion aberration.

SUMMARY OF THE INVENTION

However, in the zoom lenses described in Patent Document 1 and Patent Document 2, because the first lens group is formed by three lenses, the first lens group has a long total length in the direction of an optical axis, which hinders miniaturization.

In addition, in the zoom lens described in Patent Document 3, though miniaturization is achieved by forming the first lens group by two lenses, a sufficiently wide angle of view and a sufficiently high variable power ratio are not achieved. Specifically, the zoom lens described in Patent Document 3 has a half angle of view of 38° or less and a variable power ratio of less than 3.8, and is thus not a zoom lens that satisfies a wide angle of view and a high variable power ratio that have recently been desired.

Further, in the zoom lens described in Patent Document 4, miniaturization is achieved by actively bringing about distortion aberration. However, the zoom lens described in Patent Document 4 has a half angle of view of 30° or less and a variable power ratio of about 3.8, and is thus, again, not a zoom lens that satisfies a wide angle of view and a high variable power ratio that have recently been desired.

It is accordingly desirable to provide a zoom lens and an image pickup device that overcome the above-described problems, and which are miniaturized and ensure high optical performance with a wide angle of view and a high variable power ratio.

According to an embodiment of the present invention, there is provided a zoom lens formed by arranging a first lens group having a negative refractive power, a second lens group having a positive refractive power, and a third lens group having a positive refractive power in order from an object side to an image side. At a time of varying power from a wide-angle end to a telephoto end, the first lens group is moved and the second lens group is moved to the object side integrally with a diaphragm such that an air interval between the first lens group and the second lens group is decreased and such that an air interval between the second lens group and the third lens group is increased. The first lens group is formed by arranging a first lens as a negative lens having both surfaces formed as aspheric surfaces and having a concave surface facing the image side and a second lens as a positive meniscus lens having a surface on the object side formed as an aspheric surface and having a convex surface facing the object side in order from the object side to the image side.

Thus, the radii of curvature of central parts of both the surfaces of the first lens and the surface on the object side of the second lens and the approximate radii of curvature of peripheral parts of both the surfaces of the first lens and the surface on the object side of the second lens can be changed greatly.

The above-described zoom lens is desirably formed so as to satisfy the following conditional expression (1).

$$0 < (Sgr - Sgf)/\Delta H < 0.5 \quad (1)$$

where Sgf denotes a difference between an amount of sag of a paraxial radius of curvature of the surface on the image side of the first lens and an amount of sag of an aspheric shape of the surface on the image side of the first lens in an effective diameter of the surface on the image side of the first lens, Sgr denotes a difference between an amount of sag of a paraxial radius of curvature of the surface on the object side of the second lens and an amount of sag of an aspheric shape of the surface on the object side of the second lens in an effective diameter of the surface on the object side of the second lens, and $\Delta H$ denotes the effective diameter of the surface on the object side of the second lens (height of a position of a highest light ray passing through the second lens from an optical axis).

When the zoom lens is formed so as to satisfy the conditional expression (1), the radii of curvature of the respective central parts of both the surfaces of the first lens and the surface on the object side of the second lens and the approximate radii of curvature of the respective peripheral parts of both the surfaces of the first lens and the surface on the object side of the second lens can be changed greatly, and the edge thickness of an air lens formed between the first lens and the second lens is made proper.

It is desirable that the zoom lens be formed so as to satisfy a following conditional expression (2).

$$1.0 < |f12/f1| < 2.0 \quad (2)$$

where f12 denotes a focal length of the second lens and f1 denotes a focal length of the first lens group.

When the zoom lens is formed so as to satisfy the conditional expression (2), the focal length of the second lens is made proper.

The above-described zoom lens is desirably formed so as to satisfy the following conditional expression (3).

$$0.25<|f11/f12|<0.45 \quad (3)$$

where f11 denotes the focal length of the first lens, and f12 denotes the focal length of the second lens.

When the zoom lens is formed so as to satisfy the conditional expression (3), the focal length of the first lens and the focal length of the second lens are made proper.

The above-described zoom lens is desirably formed so as to satisfy the following conditional expression (4).

$$0.6<D1/fw<1.3 \quad (4)$$

where D1 denotes the thickness of the first lens group on the optical axis, and fw denotes the focal length of the entire lens system in a state of a wide-angle end.

When the zoom lens is formed so as to satisfy the conditional expression (4), the focal length of the first lens group is made proper.

It is desirable that the zoom lens be formed so as to satisfy a following conditional expression (5) and a following conditional expression (6).

$$n12>1.90 \quad (5)$$

$$v12<25 \quad (6)$$

where n12 denotes an index of refraction at a d-line of the second lens, and v12 denotes an Abbe number at the d-line of the second lens.

When the zoom lens is formed so as to satisfy the conditional expression (5) and the conditional expression (6), the curvature of the second lens is made proper, and the occurrence of chromatic aberration occurring in the first lens group is suppressed.

It is desirable that in the above-described zoom lens, the second lens group be formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

By forming the second lens group as described above, the front principal point of the second lens group can be made closer to the object side, and an optical total length can be shortened.

According to an embodiment of the present invention, there is provided an image pickup device including: a zoom lens; and an image pickup element for converting an optical image formed by the zoom lens into an electric signal. In the device, the zoom lens is formed by arranging a first lens group having a negative refractive power, a second lens group having a positive refractive power, and a third lens group having a positive refractive power in order from an object side to an image side. At a time of varying power from a wide-angle end to a telephoto end, the first lens group is moved and the second lens group is moved to the object side integrally with a diaphragm such that an air interval between the first lens group and the second lens group is decreased and such that an air interval between the second lens group and the third lens group is increased. The first lens group is formed by arranging a first lens as a negative lens having both surfaces formed as aspheric surfaces and having a concave surface facing the image side and a second lens as a positive meniscus lens having a surface on the object side formed as an aspheric surface and having a convex surface facing the object side in order from the object side to the image side.

Thus, the radii of curvature of central parts of both the surfaces of the first lens and the surface on the object side of the second lens of the zoom lens and the approximate radii of curvature of peripheral parts of both the surfaces of the first lens and the surface on the object side of the second lens can be changed greatly.

According to another embodiment of the present invention, there is provided a zoom lens formed by arranging a first lens group having a negative refractive power, a second lens group having a positive refractive power, and a third lens group having a positive refractive power in order from an object side to an image side. At a time of varying power from a wide-angle end to a telephoto end, the first lens group is moved and the second lens group is moved to the object side integrally with a diaphragm such that an air interval between the first lens group and the second lens group is decreased and such that an air interval between the second lens group and the third lens group is increased, and the first lens group is formed by arranging a first lens as a negative lens having both surfaces formed as aspheric surfaces and having a concave surface facing the image side and a second lens as a positive meniscus lens having a surface on the object side formed as an aspheric surface and having a convex surface facing the object side in order from the object side to the image side.

Thus, distortion aberration at the wide-angle end and spherical aberration at the telephoto end are corrected favorably, and it is possible to achieve miniaturization and ensure high optical performance with a wider angle of view and a higher variable power.

The above-described zoom lens is desirably formed so as to satisfy the following conditional expression (1).

$$0<(Sgr-Sgf)/\Delta H<0.5 \quad (1)$$

where Sgf denotes a difference between an amount of sag of a paraxial radius of curvature of the surface on the image side of the first lens and an amount of sag of an aspheric shape of the surface on the image side of the first lens in an effective diameter of the surface on the image side of the first lens, Sgr denotes a difference between an amount of sag of a paraxial radius of curvature of the surface on the object side of the second lens and an amount of sag of an aspheric shape of the surface on the object side of the second lens in an effective diameter of the surface on the object side of the second lens, and $\Delta H$ denotes the effective diameter of the surface on the object side of the second lens (height of a position of a highest light ray passing through the second lens from an optical axis).

Thus, aberrations in the first lens group can be corrected favorably, and astigmatism at the wide-angle end and spherical aberration at the telephoto end, in particular, can be corrected favorably.

In one embodiment of the present invention, the zoom lens is formed so as to satisfy a following conditional expression (2).

$$1.0<|f12/f1|<2.0 \quad (2)$$

where f12 denotes a focal length of the second lens and f1 denotes a focal length of the first lens group.

Thus, a field curvature at the wide-angle end can be corrected favorably, and mass productivity can be improved by a decrease in decentration sensitivity.

In one embodiment of the present invention, the zoom lens is desirably formed so as to satisfy the following conditional expression (3).

$$0.25 < |f11/f12| < 0.45 \quad (3)$$

where f11 denotes the focal length of the first lens, and f12 denotes the focal length of the second lens.

Thus, various aberrations can be corrected favorably, and a wider angle of view and miniaturization of the entire lens system can be achieved at the same time.

In one embodiment of the present invention, the zoom lens is desirably formed so as to satisfy the following conditional expression (4).

$$0.6 < D1/fw < 1.3 \quad (4)$$

where D1 denotes the thickness of the first lens group on the optical axis, and fw denotes the focal length of the entire lens system in a state of a wide-angle end.

Thus, it is possible to improve optical performance due to favorable correction of astigmatism and chromatic aberration, and miniaturize the entire lens system.

In one embodiment of the present invention, the zoom lens is formed so as to satisfy a following conditional expression (5) and a following conditional expression (6).

$$n12 > 1.90 \quad (5)$$

$$v12 < 25 \quad (6)$$

where n12 denotes an index of refraction at a d-line of the second lens, and v12 denotes an Abbe number at the d-line of the second lens.

Thus, difficulty in manufacturing can be avoided by decreasing decentration sensitivity while the lens frame of the first lens group is miniaturized. In addition, improvement in optical performance including favorable correction of chromatic aberration can be achieved.

In one embodiment of the present invention, the second lens group is formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

Thus, the front principal point of the second lens group can be made closer to the object side, so that the total optical length can be shortened.

According to an embodiment of the present invention, there is provided an image pickup device including: a zoom lens; and an image pickup element for converting an optical image formed by the zoom lens into an electric signal. In the device, the zoom lens is formed by arranging a first lens group having a negative refractive power, a second lens group having a positive refractive power, and a third lens group having a positive refractive power in order from an object side to an image side. At a time of varying power from a wide-angle end to a telephoto end, the first lens group is moved and the second lens group is moved to the object side integrally with a diaphragm such that an air interval between the first lens group and the second lens group is decreased and such that an air interval between the second lens group and the third lens group is increased, and the first lens group is formed by arranging a first lens as a negative lens having both surfaces formed as aspheric surfaces and having a concave surface facing the image side and a second lens as a positive meniscus lens having a surface on the object side formed as aspheric surfaces and having a convex surface facing the object side in order from the object side to the image side.

Thus, it is possible to correct distortion aberration at the wide-angle end and spherical aberration at the telephoto end effectively, miniaturize the lens, and ensure high optical performance with a wider angle of view and a higher variable power.

DETAILED DESCRIPTION OF THE PREFERRED EMBODIMENTS

The best mode for carrying out a zoom lens and an image pickup device according to the present invention will hereinafter be described.

A zoom lens according to an embodiment of the present invention will be described first.

The zoom lens according to the embodiment of the present invention is formed by arranging a first lens group having a negative refractive power, a second lens group having a positive refractive power, and a third lens group having a positive refractive power in order from an object side to an image side.

In the zoom lens according to the embodiment of the present invention, at a time of varying power from a wide-angle end to a telephoto end, the first lens group is moved and the second lens group is moved to the object side integrally with a diaphragm such that an air interval between the first lens group and the second lens group is decreased and such that an air interval between the second lens group and the third lens group is increased.

In the zoom lens according to the embodiment of the present invention, the first lens group is formed by arranging a first lens as a negative lens having both surfaces formed as aspheric surfaces and having a concave surface facing the image side and a second lens as a positive meniscus lens having a surface on the object side formed as an aspheric surface and having a convex surface facing the object side in order from the object side to the image side.

In the zoom lens according to the embodiment of the present invention, both the surfaces of the first lens of the first lens group are formed as aspheric surfaces. Thereby, negative distortion aberration and field curvature that occur noticeably at a wide-angle end when an angle of view is widened can be corrected favorably.

In addition, the surface on the object side of the second lens of the first lens group is formed as an aspheric surface. Thereby, distortion aberration and astigmatism at the wide-angle end, which cannot be corrected completely by the first lens, can be corrected in a well-balanced manner. Further, spherical aberration at a telephoto end which aberration occurs when a variable power ratio is increased is corrected favorably.

Concrete description will be made below of effects of the aspheric surfaces formed in the above-described first lens group (see FIG. 1 and FIG. 2).

Figure 1:
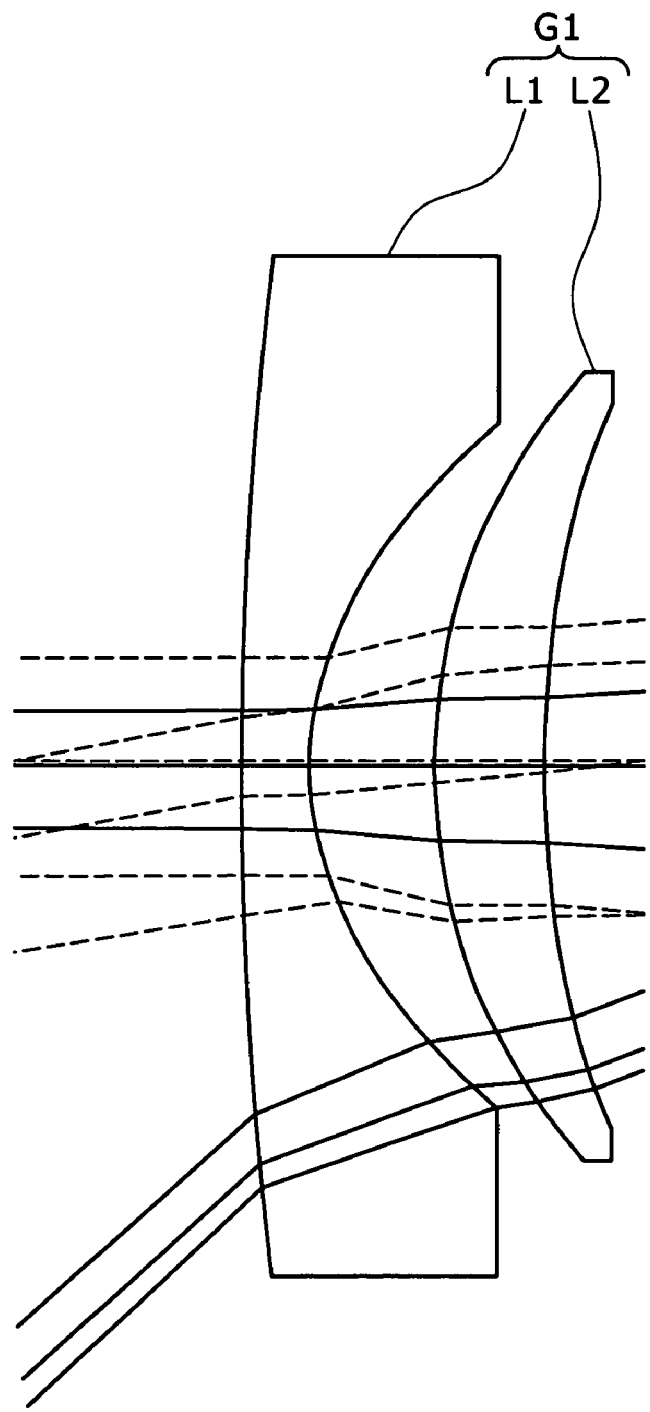
FIG. 1 shows the best mode for carrying out an image pickup device and a zoom lens according to the present invention together with FIGS. 2 to 19, FIG. 1 being a conceptual diagram showing a state of luminous fluxes incident on a first lens group.

In the zoom lens of the three negative-positive-positive groups, peripheral luminous fluxes at the wide-angle end and peripheral luminous fluxes at the telephoto end are greatly separated by both the surfaces of the first lens and the surface on the object side of the second lens (see FIG. 1). A solid line in FIG. 1 represents a luminous flux at the wide-angle end, and a broken line in FIG. 1 represents a luminous flux at the telephoto end.

Accordingly, in the zoom lens according to the embodiment of the present invention, both the surfaces of the first lens and the surface on the object side of the second lens where the peripheral luminous fluxes at the wide-angle end and the peripheral luminous fluxes at the telephoto end are greatly separated are formed as aspheric surfaces, so that an air lens formed between the first lens and the second lens is made aspheric.

Figure 2:
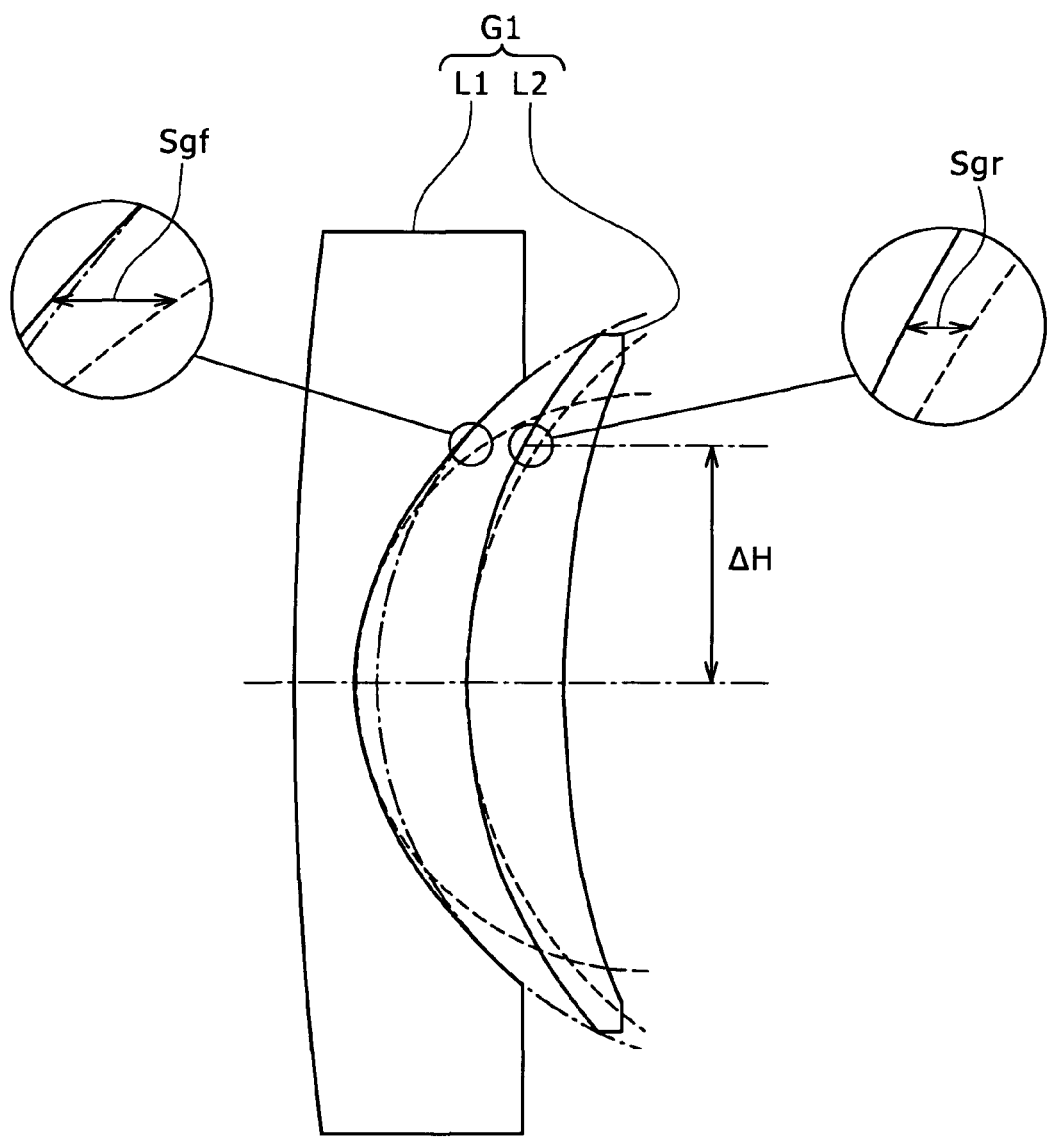
FIG. 2 is a conceptual diagram of assistance in explaining the radius of curvature of each surface in the first lens group.

With such a configuration, as shown by for example the surface on the image side of the first lens in FIG. 2, a radius of curvature of a central part of the lens and an approximate radius of curvature of a peripheral part of the lens can be greatly changed. A dotted line in FIG. 2 represents the radius of curvature of the central part, and alternate long and short dashed lines in FIG. 2 represent the approximate radius of curvature of the peripheral part.

Thus, by greatly changing the radii of curvature of central parts of both the surfaces of the first lens and the surface on the object side of the second lens and the approximate radii of curvature of peripheral parts of both the surfaces of the first lens and the surface on the object side of the second lens, it is possible to correct distortion aberration at the wide-angle end and spherical aberration at the telephoto end effectively, miniaturize the lens, and ensure high optical performance with a wider angle of view and a higher variable power.

In particular, total length of the zoom lens can be shortened at a time of being collapsed when the zoom lens according to the embodiment of the present invention is applied to a collapsible image pickup device of a type having a lens barrel that extends and contracts.

The zoom lens according to the embodiment of the present invention is desirably formed so as to satisfy the following conditional expression (1).

$$0 < (Sgr - Sgf)/\Delta H < 0.5 \quad (1)$$

where Sgf denotes a difference between an amount of sag of a paraxial radius of curvature of the surface on the image side of the first lens and an amount of sag of an aspheric shape of the surface on the image side of the first lens in an effective diameter of the surface on the image side of the first lens, Sgr denotes a difference between an amount of sag of a paraxial radius of curvature of the surface on the object side of the second lens and an amount of sag of an aspheric shape of the surface on the object side of the second lens in an effective diameter of the surface on the object side of the second lens, and $\Delta H$ denotes the effective diameter of the surface on the object side of the second lens (height of a position of a highest light ray passing through the second lens from an optical axis).

Incidentally, the sign of "Sgf" and "Sgr" is "−" when the surface shape of the paraxial radius of curvature is closer to the image side than the aspheric shape, and is "+" in the case of the opposite relation.

A conditional expression (1) defines relation between aspheric shapes formed on the surface on the image side of the first lens as a negative lens in the first lens group and the surface on the object side of the second lens as a positive lens. That is, the conditional expression (1) defines the shape of an aspheric air lens formed between the first lens and the second lens (see FIG. 2).

When a lower limit value of the conditional expression (1) is exceeded, edge thickness, which is the thickness in the direction of the optical axis of an outermost edge of the air lens formed between the first lens and the second lens, is reduced, and negative refractive power becomes strong. Thus, the correcting effect of the aspheric lens is reduced, and various off-axis aberrations become too large. Correction of astigmatism at the wide-angle end, in particular, becomes difficult, so that optical performance is degraded.

On the other hand, when an upper limit value of the conditional expression (1) is exceeded, the edge thickness of the air lens formed between the first lens and the second lens is increased, and thus the refractive power of the peripheral part in the first lens group is weakened. Therefore, various aberrations are corrected excessively, or field curvature aberrations at the wide-angle end and at the telephoto end that occur at a time of decentration are opposite from each other. Thus, aberration correction in the first lens group becomes difficult, and manufacturing of each lens in the first lens group also becomes difficult.

Therefore, when the zoom lens satisfies the conditional expression (1), aberrations in the first lens group can be corrected favorably, astigmatism at the wide-angle end, in particular, can be corrected favorably, and the difficulty in manufacturing of each lens in the first lens group can be avoided.

The zoom lens according to one embodiment of the present invention is desirably formed so as to satisfy the following conditional expression (2).

$$1.0<|f12/f1|<2.0 \tag{2}$$

where f12 denotes the focal length of the second lens and f1 denotes the focal length of the first lens group.

The conditional expression (2) defines a ratio between the focal length of the second lens of the first lens group and the focal length of the first lens group.

When the lower limit value of the conditional expression (2) is exceeded, the focal length of the second lens becomes too short, and therefore the thickness of the second lens needs to be increased, which hinders size reduction. In addition, amounts of various aberrations occurring in the second lens are increased, and decentration sensitivity is raised, so that mass productivity is impaired.

On the other hand, when the upper limit value of the conditional expression (2) is exceeded, the focal length of the second lens becomes too long, and therefore aberration correction, especially correction of field curvature at the wide-angle end becomes difficult.

Thus, when the zoom lens satisfies the conditional expression (2), it is possible to improve mass productivity by a decrease in decentration sensitivity, and perform favorable aberration correction, especially favorable correction of field curvature at the wide-angle end.

The zoom lens according to the embodiment is desirably formed so as to satisfy the following conditional expression (3).

$$0.25<|f11/f12|<0.45 \tag{3}$$

where f11 denotes the focal length of the first lens, and f12 denotes the focal length of the second lens.

The conditional expression (3) defines a ratio between the focal lengths of the first lens and the second lens of the first lens group.

When a lower limit value of the conditional expression (3) is exceeded, various off-axis aberrations become too large. In particular, it becomes difficult to make correction of astigmatism at the wide-angle end and correction of spherical aberration at the telephoto end compatible with each other, thus resulting in degradation in optical performance.

On the other hand, when an upper limit value of the conditional expression (3) is exceeded, the focal length of the first lens becomes too long, or the focal length of the second lens becomes too short, and the negative focal length of the first lens group becomes too long, so that a wider angle of view and miniaturization of the entire lens system cannot be achieved at the same time. In particular, when the thickness of the first lens group is increased, the length of the zoom lens when the zoom lens is used in a collapsible image pickup device of a type having a lens barrel that extends and contracts is lengthened, hindering the miniaturization of the entire lens system.

Thus, when the zoom lens satisfies the conditional expression (3), various aberrations can be corrected favorably, and a wider angle of view and miniaturization of the entire lens system can be achieved at the same time.

The zoom lens according to the embodiment is desirably formed so as to satisfy the following conditional expression (4).

$$0.6<D1/fw<1.3 \tag{4}$$

where D1 denotes the thickness of the first lens group on the optical axis, and fw denotes the focal length of the entire lens system in a state of a wide-angle end.

The conditional expression (4) defines the thickness on the optical axis of the first lens group in relation to the focal length at the wide-angle end.

When the lower limit value of the conditional expression (4) is exceeded, amounts of various off-axis aberrations become too large, and correction of astigmatism at the wide-angle end, in particular, becomes difficult, so that optical performance is impaired.

On the other hand, when the upper limit value of the conditional expression (4) is exceeded, the thickness of the first lens group is increased, which hinders reduction in size of the entire lens system.

Thus, when the zoom lens satisfies the conditional expression (4), it is possible to improve optical performance due to favorable correction of astigmatism, and miniaturize the entire lens system.

In addition, by satisfying the conditional expression (2) through the conditional expression (4), it is possible to achieve miniaturization due to the shortening of total optical length, and improve optical performance.

The zoom lens according to one embodiment of the present invention is desirably formed so as to satisfy the following conditional expression (5) and the following conditional expression (6).

$$n12>1.90 \tag{5}$$

$$v12<25 \tag{6}$$

where n12 denotes the index of refraction at a d-line of the second lens, and v12 denotes the Abbe number at the d-line of the second lens.

The conditional expression (5) and the conditional expression (6) define the index of refraction and the Abbe number of the second lens forming the first lens group.

When the range of the conditional expression (5) is exceeded, the curvature of the second lens needs to be increased, and optical performance is degraded due to difficulty in correcting field curvature at the wide-angle end. In addition, it becomes difficult to secure edge thickness and therefore manufacturing difficulty increases.

Thus, when the zoom lens satisfies the conditional expression (5), it is possible to improve the optical performance, and avoid the manufacturing difficulty.

When the range of the conditional expression (6) is exceeded, it becomes difficult to correct chromatic aberration occurring in the first lens group, thus inviting degradation in optical performance.

Thus, when the zoom lens satisfies the conditional expression (6), the optical performance can be improved by favorable correction of chromatic aberration.

In the zoom lens according to one embodiment of the present invention, the second lens group is desirably formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

By thus forming the second lens group, the second lens group is formed by a small number of lenses, so that the total length can be shortened. In addition, the front principal point of the second lens group can be made closer to the object side, so that the total optical length can be shortened. Further, by forming the surface of the second lens group which surface is closest to the object side by an aspheric surface, spherical aberration and coma aberration can be corrected favorably.

Incidentally, the zoom lens according to the embodiment of the present invention can shift an image by moving (shifting) one lens group of the first to third lens groups or a part of one lens group in a direction substantially perpendicular to the optical axis. The zoom lens can be made to function also as an antivibration optical system by thus moving a lens group or a part of the lens group in the direction substantially perpendicular to the optical axis, and combining the zoom lens with a detecting system for detecting an image blur, a driving system for shifting each lens group, and a controlling system for providing an amount of shift to the driving system on the basis of the output of the detecting system. In particular, the zoom lens according to the embodiment of the present invention can shift an image with a small variation in aberration by shifting the whole of the second lens group in the direction substantially perpendicular to the optical axis.

The zoom lens according to the embodiment of the present invention desirably performs focusing by moving the first lens group or the third lens group in the direction of the optical axis. Using the third lens group as a lens group for focusing, in particular, makes it easy to avoid interference with a driving system for driving and controlling a shutter unit and an iris unit and with an antivibration driving system for shifting a lens group, and makes it possible to achieve miniaturization.

A concrete embodiment of the zoom lens according to the present invention and numerical embodiments in which concrete numerical values are applied to the embodiment will next be described with reference to drawings and tables.

Incidentally, the meanings of symbols shown in the tables and description in the following and the like are as follows.

"si" is the surface number of an ith surface numbered from the object side to the image side, "ri" is the radius of curvature of the ith surface, "di" is a surface interval on the axis between the ith surface and an (i+1)th surface, "ni" is the index of refraction at the d-line (wavelength of 587.6 nm) of a material forming an ith lens, and "vi" is the Abbe number at the d-line of the material forming the ith lens. In regard to the radius of curvature, "ASP" denotes that the surface is an aspheric surface, and "INF" denotes that the curvature of the surface is infinite.

Lenses used in each numerical embodiment include lenses whose lens surface is formed as an aspheric surface. Letting "x" be a distance in the direction of the optical axis from the vertex of the lens surface, "y" be a height in a direction perpendicular to the optical axis, "c" be a paraxial curvature (reciprocal of a radius of curvature) at the vertex of the lens, "K" be a conic constant, and "Ai" be an i-th order aspheric coefficient, the aspheric shape is defined by the following Equation 1.

$$x = \frac{c \cdot y^2}{1 + \{1 - (1+K) \cdot c^2 \cdot y^2\}^{1/2}} + \Sigma Ai \cdot Yi \quad \text{[Equation 1]}$$

A first to a fourth embodiment of the present invention will hereinafter be described (see FIG. 3 to FIG. 18).

Zoom lenses according to the first to fourth embodiments are each formed by arranging a first lens group having a negative refractive power, a second lens group having a positive refractive power, and a third lens group having a positive refractive power in order from an object side to an image side. In addition, in each of the zoom lenses according to the first to fourth embodiments, at a time of varying power from a wide-angle end to a telephoto end, the first lens group is moved and the second lens group is moved to the object side integrally with a diaphragm such that an air interval between the first lens group and the second lens group is decreased and such that an air interval between the second lens group and the third lens group is increased.

Figure 3:
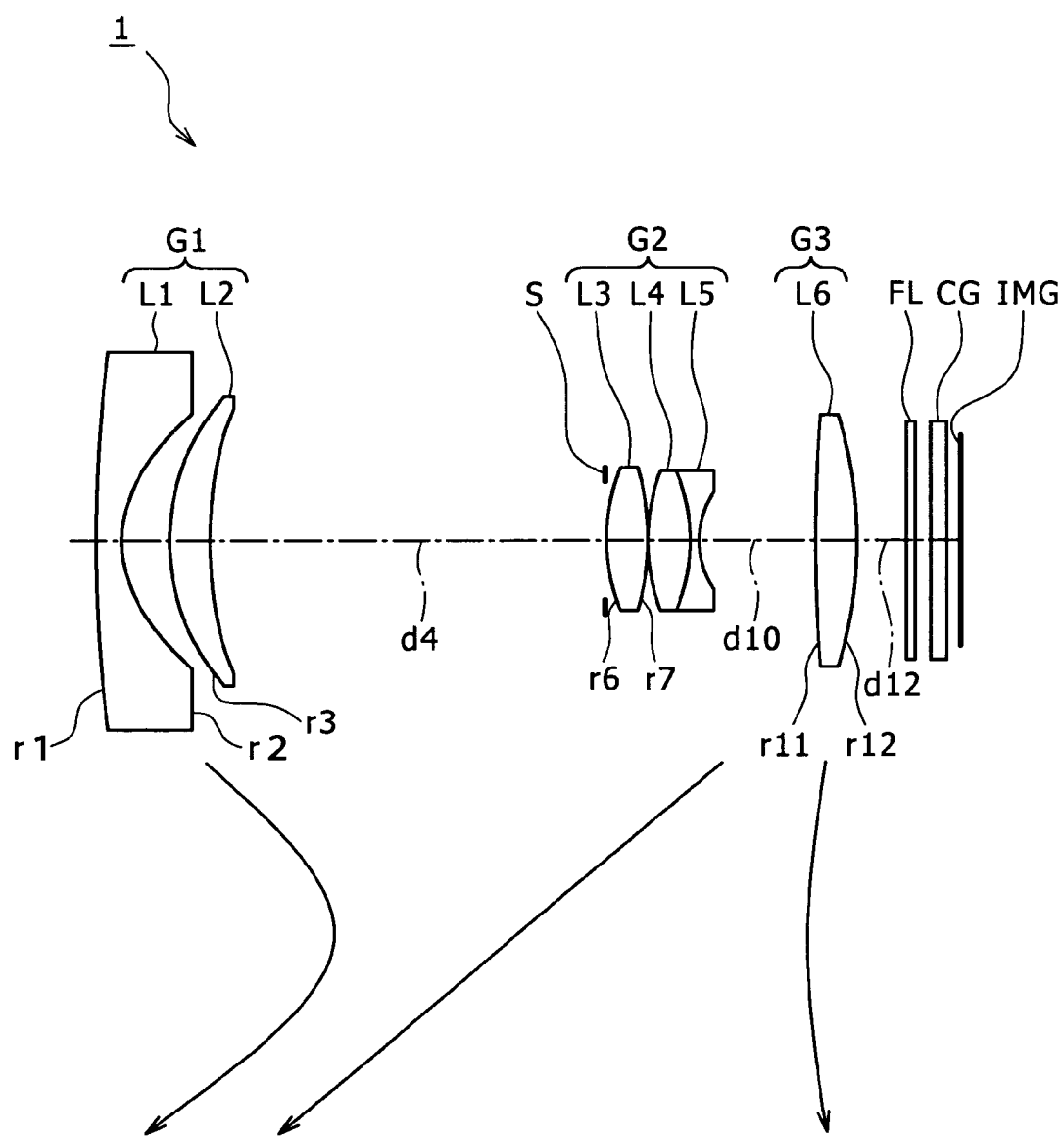
FIG. 3 is a diagram showing the lens configuration of a first embodiment of the zoom lens according to the present invention.

FIG. 3 is a diagram showing the lens configuration of a zoom lens 1 according to a first embodiment of the present invention.

The zoom lens 1 according to the first embodiment has six lenses, as shown in FIG. 3.

The zoom lens 1 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a negative meniscus lens having both surfaces formed as aspheric surfaces and having a convex surface facing the object side and a second lens L2 as a positive meniscus lens having a surface on the object side formed as an aspheric surface and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface r5) is disposed between the first lens group G1 and the second lens group G2.

A filter FL and a cover glass CG are arranged in order from the object side to the image side between the third lens group G3 and an image surface IMG.

Table 1 shows lens data of a first numerical embodiment in which concrete numerical values are applied to the zoom lens 1 according to the first embodiment.

TABLE 1

| si | ri | ASP | di | ni | vi |
|---|---|---|---|---|---|
| 1 | 51.004 | ASP | 1.000 | 1.85135 | 40.10 |
| 2 | 5.314 | ASP | 1.785 | | |
| 3 | 9.1375 | ASP | 1.561 | 2.00178 | 19.30 |
| 4 | 15.7495 | | variable | | |
| 5 (diaphragm) | INF | | 0.000 | | |
| 6 | 6.000 | ASP | 1.598 | 1.58247 | 56.33 |
| 7 | −15.365 | ASP | 0.100 | | |
| 8 | 8.026 | | 1.533 | 1.87104 | 41.30 |
| 9 | −9.264 | | 0.400 | 1.71899 | 28.70 |
| 10 | 3.497 | | variable | | |
| 11 | 70.0764 | ASP | 1.638 | 1.69362 | 50.54 |
| 12 | −13.716 | ASP | variable | | |
| 13 | INF | | 0.300 | 1.51680 | 64.20 |
| 14 | INF | | 0.720 | | |

TABLE 1-continued

| si | ri | ASP | di | ni | vi |
|---|---|---|---|---|---|
| 15 | INF | | 0.500 | 1.56883 | 56.04 |
| 16 | INF | | 0.600 | | |
| IMG | INF | | 0.000 | 1.56883 | 56.04 |

In the zoom lens 1, the surface (r1) on the object side of the first lens L1 of the first lens group G1, the surface (r2) on the image side of the first lens L1 of the first lens group G1, the surface (r3) on the object side of the second lens L2 of the first lens group G1, the surface (r6) on the object side of the third lens L3 of the second lens group G2, the surface (r7) on the image side of the third lens L3 of the second lens group G2, the surface (r11) on the object side of the sixth lens L6 of the third lens group G3, and the surface (r12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the first numerical embodiment are shown in Table 2 together with the conic constant K.

Incidentally, "E-i" in Table 2 and each table showing aspheric coefficients to be described later denotes an exponential expression having a base of 10, that is, "$10^{-i}$." For example, "0.12345E-05" denotes "$0.12345 \times 10^{-5}$."

TABLE 2

| i | K | A4 | A6 | A8 | A10 |
|---|---|---|---|---|---|
| 1 | 2.0000E+01 | −3.8223E−04 | 1.6110E−05 | −2.8622E−07 | 1.8392E−09 |
| 2 | −6.3006E−01 | −1.8765E−04 | 4.0957E−06 | 9.0112E−07 | −2.0778E−08 |
| 3 | 5.8272E−01 | 4.0876E−05 | −1.0549E−05 | 3.8128E−07 | −5.9041E−09 |
| 6 | 7.4255E−01 | −1.8876E−03 | −1.0878E−04 | −1.3862E−06 | −1.2258E−06 |
| 7 | −1.8912E+01 | −1.0342E−03 | −5.4293E−05 | −6.6201E−06 | −4.4260E−07 |
| 11 | −2.0000E+01 | −2.2302E−04 | −1.9139E−05 | 2.7084E−06 | −5.9550E−08 |
| 12 | 4.1053E+00 | 5.7325E−04 | −5.2523E−05 | 4.5376E−06 | −8.8555E−08 |

In the zoom lens 1, at a time of varying power between a wide-angle end state and a telephoto end state, a surface interval d4 between the first lens group G1 and the diaphragm S, a surface interval d10 between the second lens group G2 and the third lens group G3, and a surface interval d12 between the third lens group G3 and the filter FL are changed. Variable intervals in a wide-angle end state (focal length f=4.41), an intermediate focal length state (focal length f=9.57), and a telephoto end state (focal length f=20.77) of each surface interval in the first numerical embodiment are shown in Table 3 together with an F-number Fno and a half angle of view ω.

TABLE 3

| f | 4.41 | 9.57 | 20.77 |
|---|---|---|---|
| Fno. | 2.51 | 3.59 | 6.09 |
| ω | 42.91 | 22.17 | 10.63 |
| d4 | 15.782 | 5.332 | 0.880 |
| d10 | 4.600 | 9.750 | 21.886 |
| d12 | 2.013 | 2.349 | 1.900 |

The focal lengths of the first lens group G1, the second lens group G2, and the third lens group G3 in the zoom lens 1 are shown in Table 4 together with the surface of each lens group which surface is closest to the object side (starting surface).

TABLE 4

| | Starting Surface | Focal Length |
|---|---|---|
| 1st Group | 1 | −11.752 |
| 2nd Group | 5 | 9.403 |
| 3rd Group | 11 | 16.594 |

Figure 4:
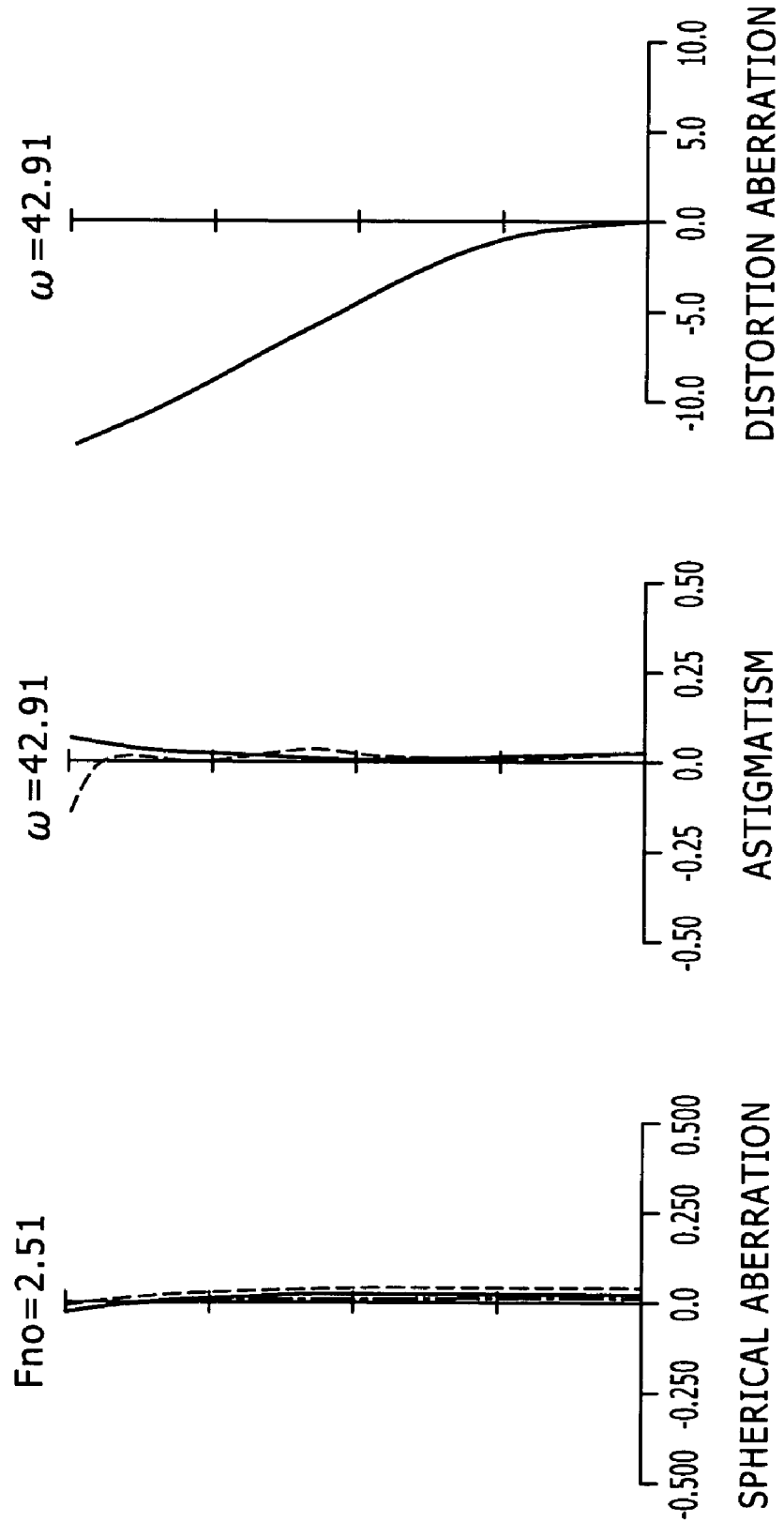
FIG. 4 is a diagram showing aberrations of a numerical embodiment in which concrete numerical values are applied to the first embodiment together with FIG. 5 and FIG. 6, FIG. 4 being a diagram showing spherical aberration, astigmatism, and distortion aberration in a wide-angle end state.
Figure 5:
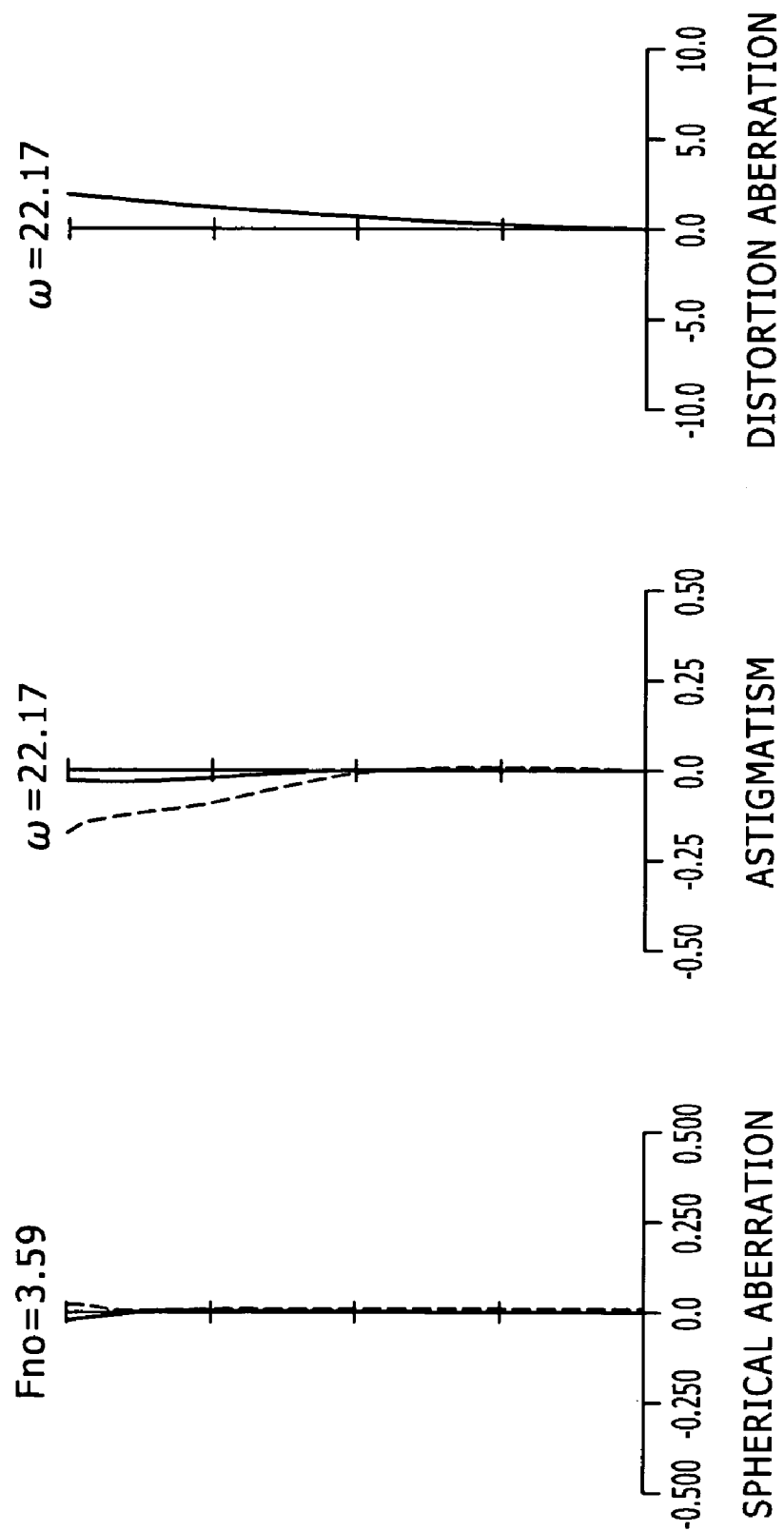
FIG. 5 is a diagram showing spherical aberration, astigmatism, and distortion aberration in an intermediate focal length state.
Figure 6:
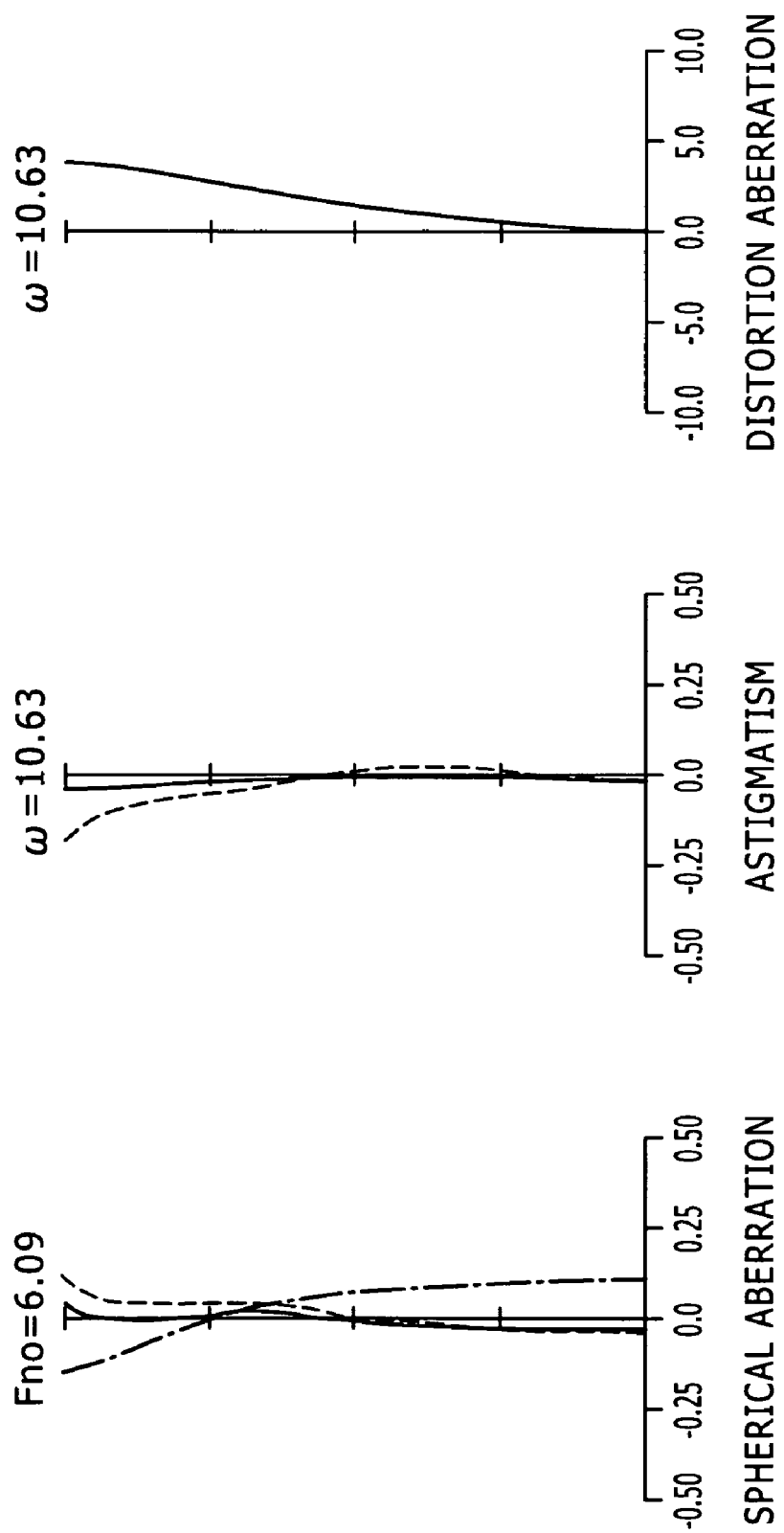
FIG. 6 is a diagram showing spherical aberration, astigmatism, and distortion aberration in a telephoto end state.

FIGS. 4 to 6 are diagrams of various aberrations in an infinity in-focus state in the first numerical embodiment. FIG. 4 is a diagram of various aberrations in the wide-angle end state (focal length f=4.41). FIG. 5 is a diagram of various aberrations in the intermediate focal length state (focal length f=9.57). FIG. 6 is a diagram of various aberrations in the telephoto end state (focal length f=20.77).

In the diagrams of spherical aberrations shown in FIGS. 4 to 6, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 4 to 6, a value in a sagittal image surface is shown by a solid line, and a value in a meridional image surface is shown by a broken line.

It is clear from each aberration diagram that the first numerical embodiment favorably corrects various aberrations and has excellent image forming performance.

Figure 7:
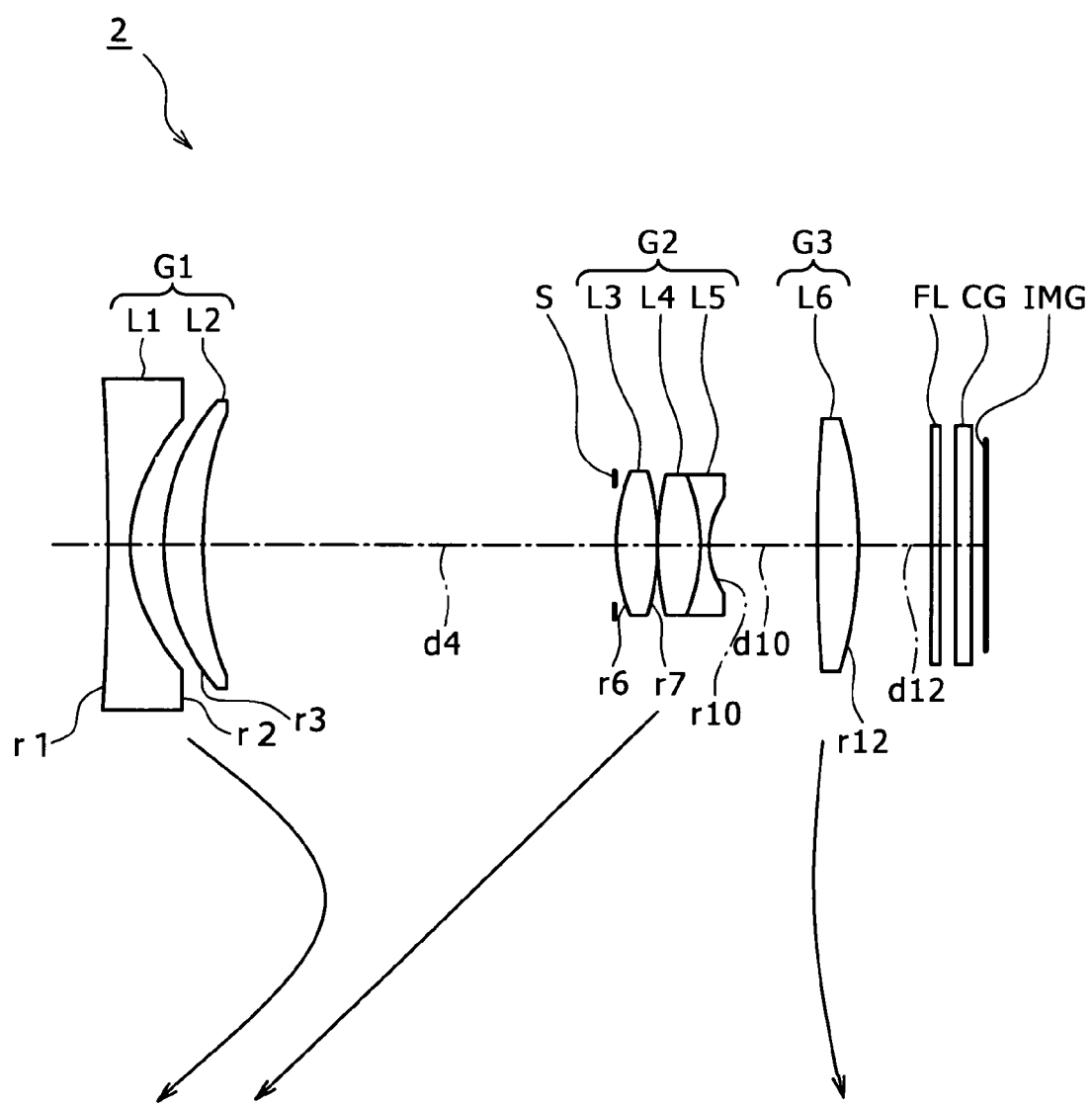
FIG. 7 is a diagram showing the lens configuration of a second embodiment of the zoom lens according to the present invention.

FIG. 7 is a diagram showing the lens configuration of a zoom lens 2 according to a second embodiment of the present invention.

The zoom lens 2 according to the second embodiment has six lenses, as shown in FIG. 7.

The zoom lens 2 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a double-concave lens having both surfaces formed as aspheric surfaces and a second lens L2 as a positive meniscus lens having a surface on the object side formed as an aspheric surface and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens having a surface on the image side formed as an aspheric surface in order from the object side to the image side.

The third lens group G3 is formed by arranging a sixth lens L6 as a double-convex lens having a surface on the object side formed as an aspheric surface.

A diaphragm S (diaphragm surface r5) is disposed between the first lens group G1 and the second lens group G2.

A filter FL and a cover glass CG are arranged in order from the object side to the image side between the third lens group G3 and an image surface IMG.

Table 5 shows lens data of a second numerical embodiment in which concrete numerical values are applied to the zoom lens 2 according to the second embodiment.

TABLE 5

| si | ri | ASP | di | ni | vi |
|---|---|---|---|---|---|
| 1 | 214.861 | ASP | 0.856 | 1.83441 | 37.29 |
| 2 | 6.216 | ASP | 1.440 | | |
| 3 | 11.5062 | ASP | 1.676 | 2.00178 | 19.30 |
| 4 | 27.5092 | | variable | | |
| 5 (diaphragm) | INF | | 0.000 | | |
| 6 | 6.066 | ASP | 1.599 | 1.69350 | 53.20 |
| 7 | −18.570 | ASP | 0.100 | | |
| 8 | 20.914 | | 1.508 | 1.84840 | 42.34 |
| 9 | −5.878 | | 0.400 | 1.68893 | 31.16 |
| 10 | 4.322 | ASP | variable | | |
| 11 | 38.250 | | 1.614 | 1.58313 | 59.46 |
| 12 | −14.779 | ASP | variable | | |
| 13 | INF | | 0.300 | 1.51680 | 64.20 |
| 14 | INF | | 0.720 | | |
| 15 | INF | | 0.500 | 1.56883 | 56.04 |
| 16 | INF | | 0.600 | | |
| IMG | INF | | 0.000 | | |

In the zoom lens 2, the surface (r1) on the object side of the first lens L1 of the first lens group G1, the surface (r2) on the image side of the first lens L1 of the first lens group G1, the surface (r3) on the object side of the second lens L2 of the first lens group G1, the surface (r6) on the object side of the third lens L3 of the second lens group G2, the surface (r7) on the image side of the third lens L3 of the second lens group G2, the surface (r10) on the image side of the fifth lens L5 of the second lens group G2, and the surface (r12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the second numerical embodiment are shown in Table 6 together with the conic constant K.

TABLE 6

| i | K | A4 | A6 | A8 | A10 |
|---|---|---|---|---|---|
| 1 | 2.0000E+01 | −5.7710E−04 | 2.1678E−05 | −3.6784E−07 | 2.2661E−09 |
| 2 | −6.3006E−01 | −3.6169E−04 | −4.5452E−06 | 9.5439E−07 | −1.9289E−08 |
| 3 | 5.8272E−01 | 1.8111E−04 | −1.6609E−05 | 6.0704E−07 | −7.7970E−09 |
| 6 | 7.4255E−01 | −1.4640E−03 | −7.7795E−05 | −1.3862E−06 | −1.2258E−06 |
| 7 | −1.8912E+01 | −3.2424E−04 | −5.7153E−05 | −6.6201E−06 | −4.4260E−07 |
| 10 | 0.0000E+00 | 2.0465E−04 | 8.2300E−05 | 0.0000E+00 | 0.0000E+00 |
| 12 | 4.1053E+00 | 7.1804E−04 | −2.0675E−05 | 7.9620E−07 | −1.0518E−08 |

In the zoom lens 2, at a time of varying power between a wide-angle end state and a telephoto end state, a surface interval d4 between the first lens group G1 and the diaphragm S, a surface interval d10 between the second lens group G2 and the third lens group G3, and a surface interval d12 between the third lens group G3 and the filter FL are changed. Variable intervals in a wide-angle end state (focal length f=5.10), an intermediate focal length state (focal length f=10.58), and a telephoto end state (focal length f=21.93) of each surface interval in the second numerical embodiment are shown in Table 7 together with an F-number Fno and a half angle of view ω.

TABLE 7

| f | 5.10 | 10.58 | 21.93 |
|---|---|---|---|
| Fno. | 2.59 | 3.64 | 5.96 |
| ω | 38.85 | 19.97 | 9.76 |
| d4 | 16.630 | 5.672 | 0.880 |
| d10 | 4.600 | 10.211 | 22.308 |
| d12 | 2.999 | 3.109 | 1.900 |

The focal lengths of the first lens group G1, the second lens group G2, and the third lens group G3 in the zoom lens 2 are shown in Table 8 together with the surface of each lens group which surface is closest to the object side (starting surface).

TABLE 8

| | Starting Surface | Focal Length |
|---|---|---|
| 1st Group | 1 | −14.103 |
| 2nd Group | 5 | 10.565 |
| 3rd Group | 11 | 18.415 |

Figure 8:
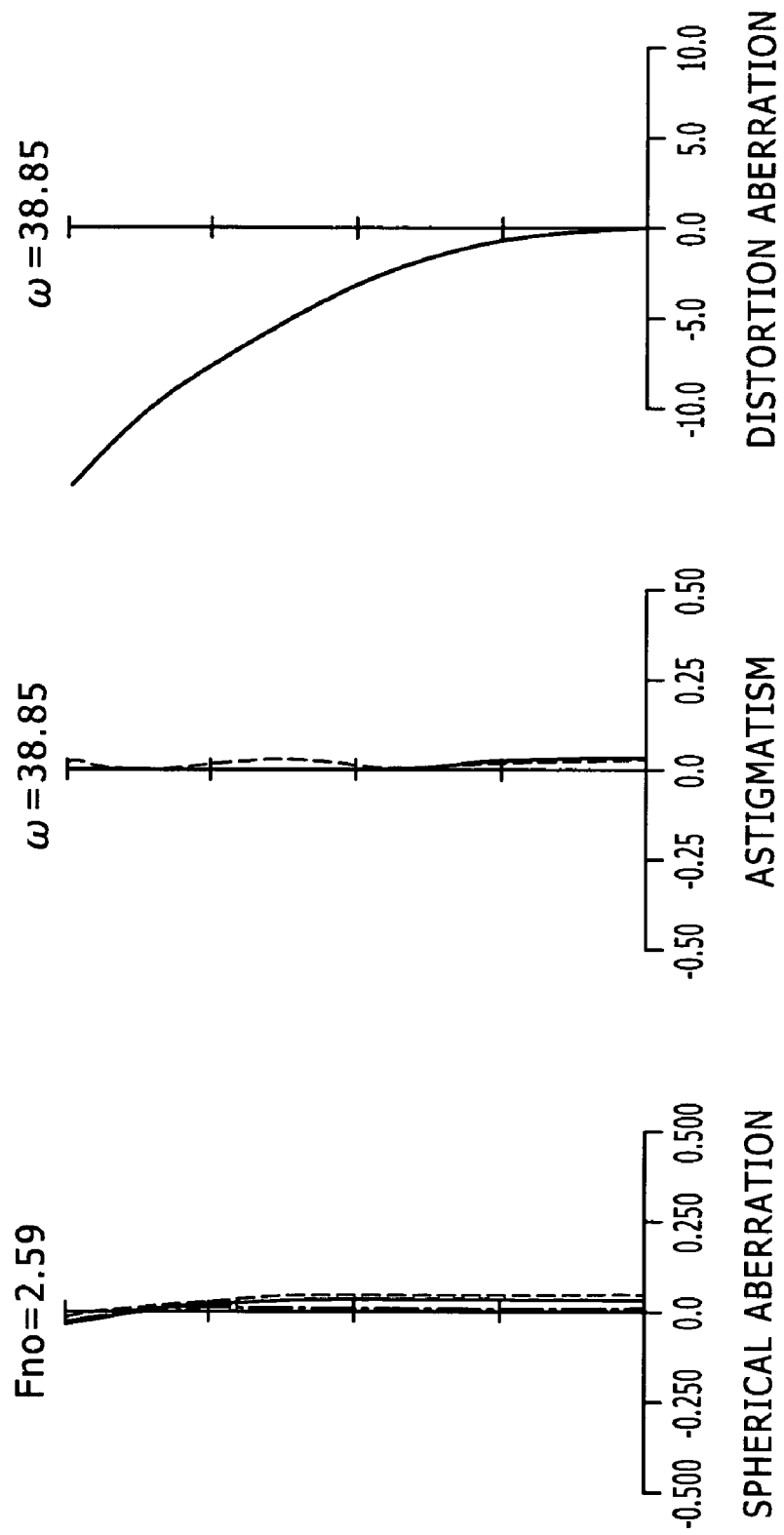
FIG. 8 is a diagram showing aberrations of a numerical embodiment in which concrete numerical values are applied to the second embodiment together with FIG. 9 and FIG. 10, FIG. 8 being a diagram showing spherical aberration, astigmatism, and distortion aberration in a wide-angle end state.
Figure 9:
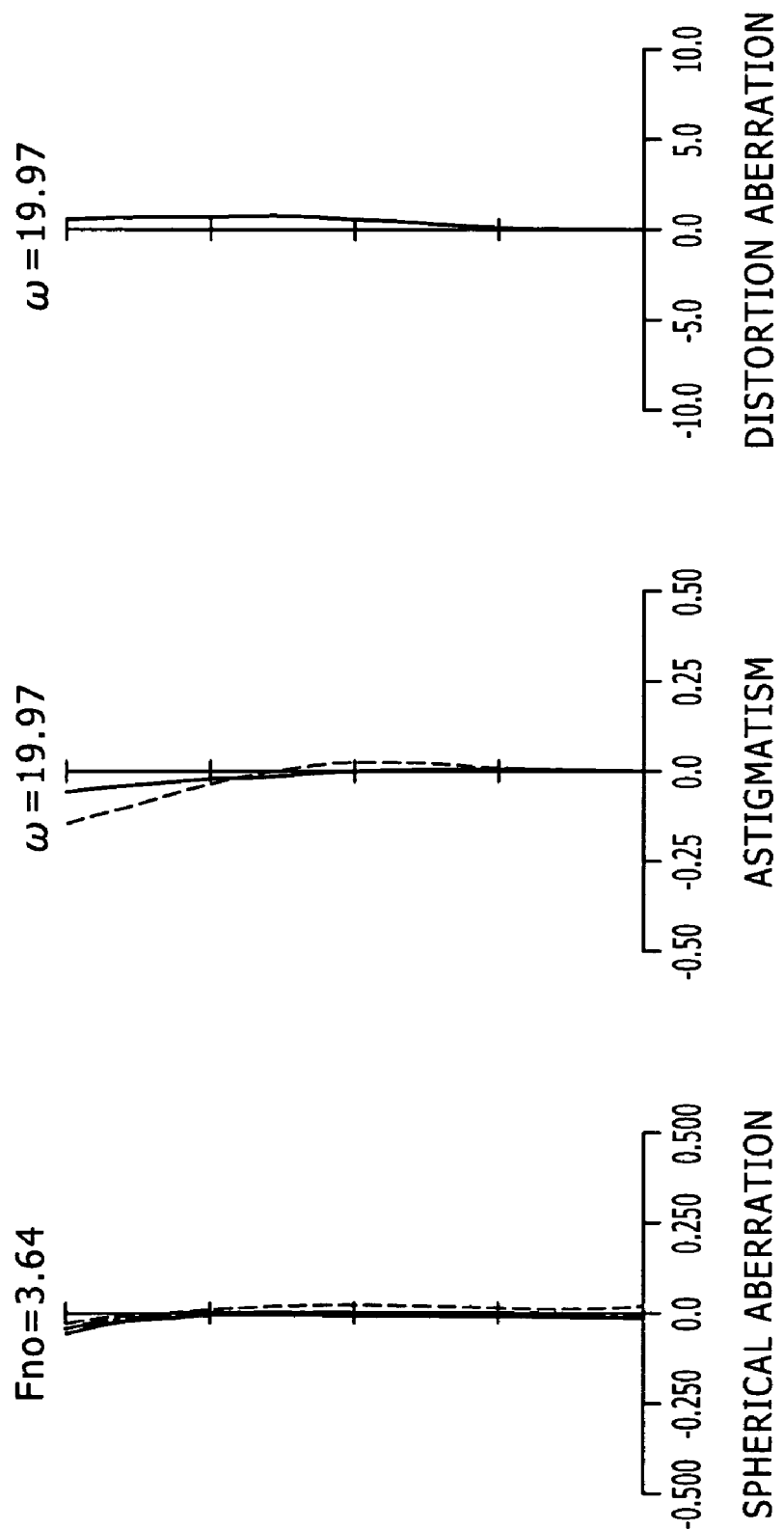
FIG. 9 is a diagram showing spherical aberration, astigmatism, and distortion aberration in an intermediate focal length state.
Figure 10:
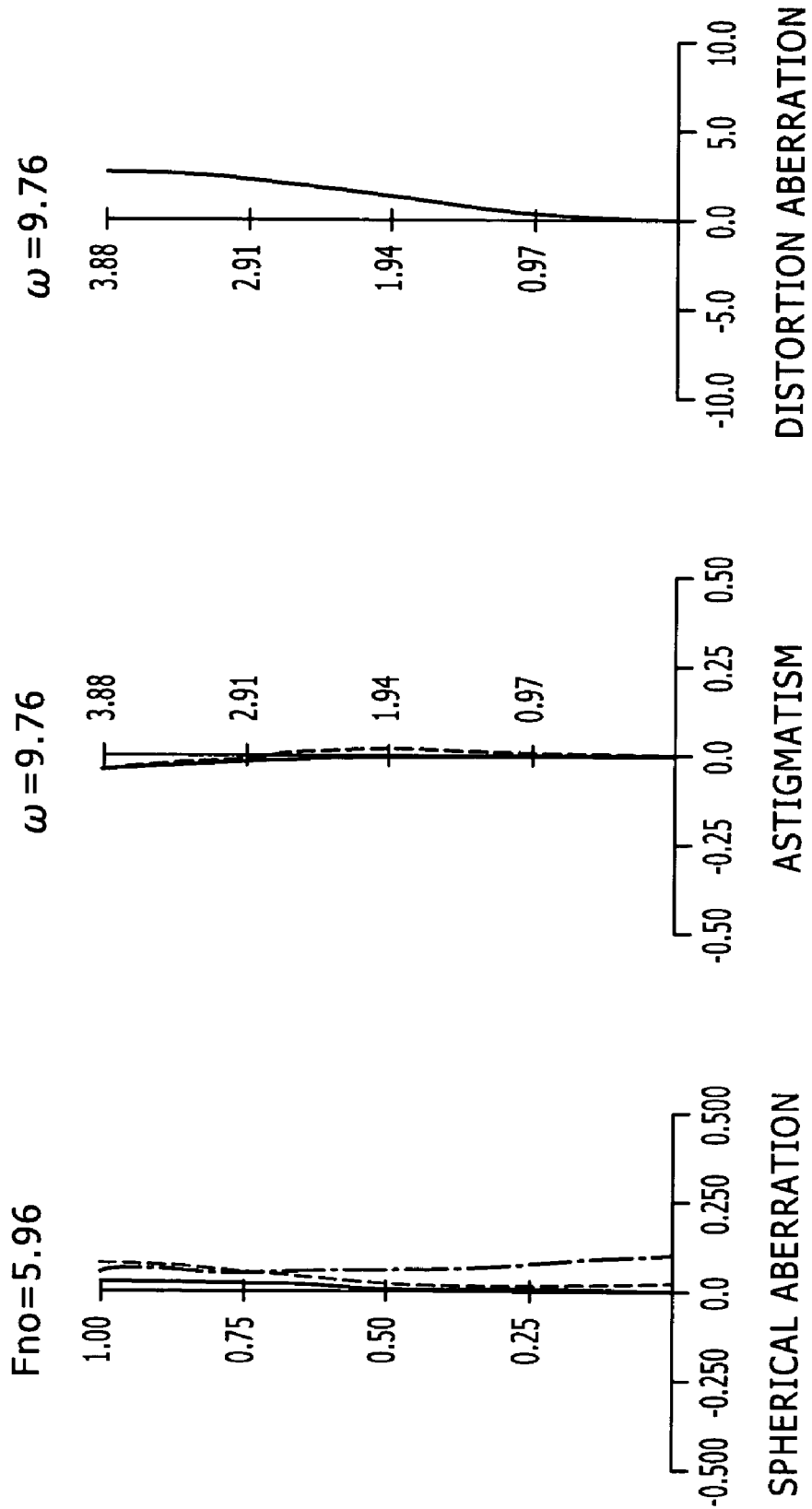
FIG. 10 is a diagram showing spherical aberration, astigmatism, and distortion aberration in a telephoto end state.

FIGS. 8 to 10 are diagrams of various aberrations in an infinity in-focus state in the second numerical embodiment. FIG. 8 is a diagram of various aberrations in the wide-angle end state (focal length f=5.10). FIG. 9 is a diagram of various aberrations in the intermediate focal length state (focal length f=10.58). FIG. 10 is a diagram of various aberrations in the telephoto end state (focal length f=21.93).

In the diagrams of spherical aberrations shown in FIGS. 8 to 10, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 8 to 10, a value in a sagittal image surface is shown by a solid line, and a value in a meridional image surface is shown by a broken line.

It is clear from each aberration diagram that the second numerical embodiment favorably corrects various aberrations and has excellent image forming performance.

Figure 11:
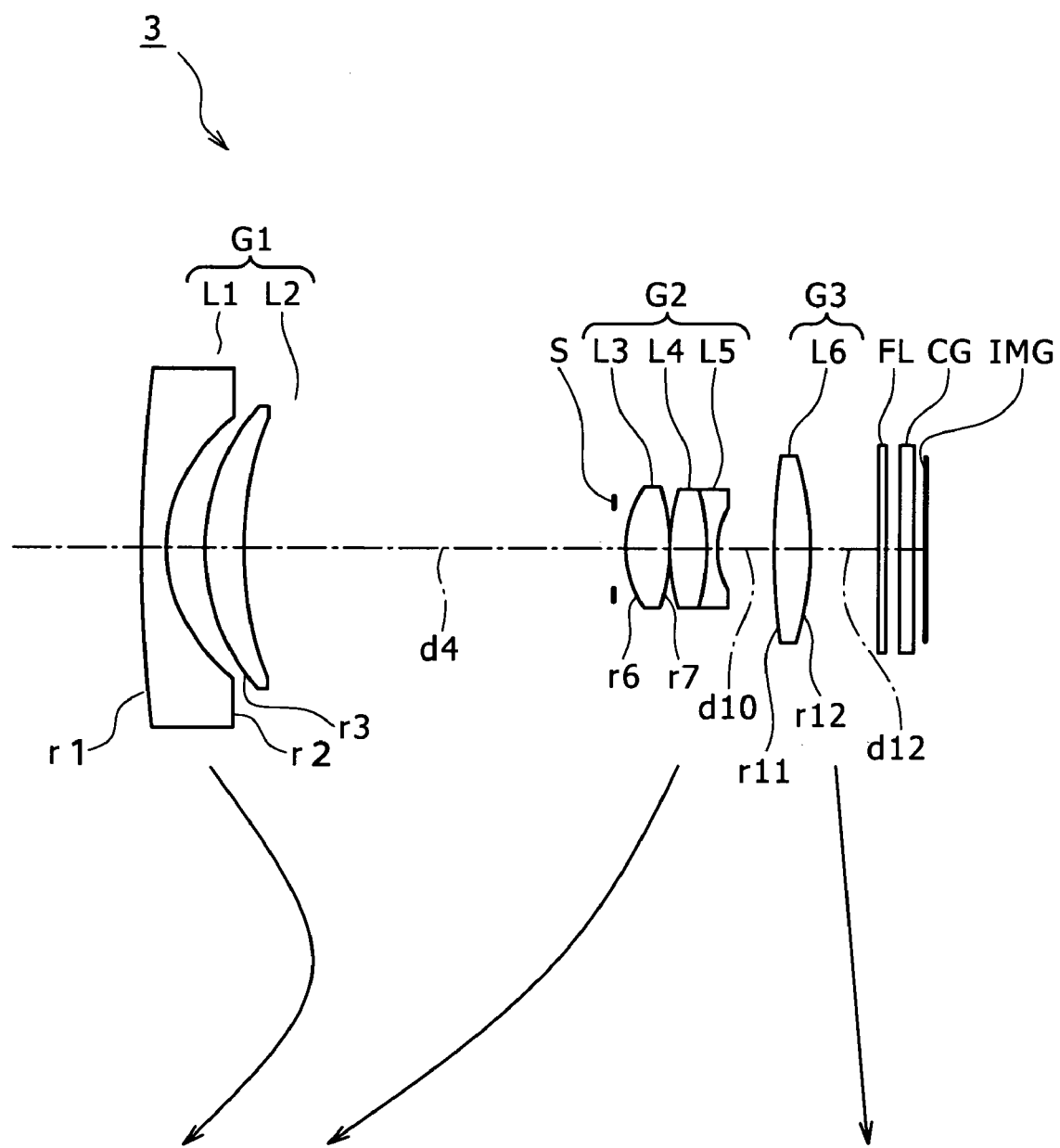
FIG. 11 is a diagram showing the lens configuration of a third embodiment of the zoom lens according to the present invention.

FIG. 11 is a diagram showing the lens configuration of a zoom lens 3 according to a third embodiment of the present invention.

The zoom lens 3 according to the third embodiment has six lenses, as shown in FIG. 11.

The zoom lens 3 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a negative meniscus lens having both surfaces formed as aspheric surfaces and having a convex surface facing the object side and a second lens L2 as a positive meniscus lens having a surface on the object side formed as an aspheric surface and having a convex surface facing the object side in order from the object side to the image side.

The second lens group G2 is formed by arranging a third lens L3 as a double-convex lens having both surfaces formed as aspheric surfaces and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface r5) is disposed between the first lens group G1 and the second lens group G2.

A filter FL and a cover glass CG are arranged in order from the object side to the image side between the third lens group G3 and an image surface IMG.

Table 9 shows lens data of a third numerical embodiment in which concrete numerical values are applied to the zoom lens 3 according to the third embodiment.

TABLE 9

| si | ri | ASP | di | ni | vi |
|---|---|---|---|---|---|
| 1 | 143.068 | ASP | 1.050 | 1.85135 | 40.10 |
| 2 | 6.195 | ASP | 1.780 | | |
| 3 | 9.0533 | ASP | 1.600 | 2.00178 | 19.30 |
| 4 | 14.8385 | | variable | | |
| 5 (diaphragm) | INF | | 0.500 | | |
| 6 | 5.286 | ASP | 1.850 | 1.62263 | 58.16 |
| 7 | −20.807 | ASP | 0.150 | | |
| 8 | 10.464 | | 1.600 | 1.81600 | 46.57 |
| 9 | −8.772 | | 0.450 | 1.68893 | 31.16 |
| 10 | 3.502 | | variable | | |
| 11 | 83.694 | ASP | 1.650 | 1.53110 | 56.00 |
| 12 | −10.606 | ASP | variable | | |
| 13 | INF | | 0.300 | 1.51680 | 41.98 |
| 14 | INF | | 0.720 | | |
| 15 | INF | | 0.500 | 1.56883 | 56.04 |
| 16 | INF | | 0.600 | | |
| IMG | INF | | 0.000 | | |

In the zoom lens 3, the surface (r1) on the object side of the first lens L1 of the first lens group G1, the surface (r2) on the image side of the first lens L1 of the first lens group G1, the surface (r3) on the object side of the second lens L2 of the first lens group G1, the surface (r6) on the object side of the third lens L3 of the second lens group G2, the surface (r7) on the image side of the third lens L3 of the second lens group G2, the surface (r11) on the object side of the sixth lens L6 of the third lens group G3, and the surface (r12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the third numerical embodiment are shown in Table 10 together with the conic constant K.

In the zoom lens 3, at a time of varying power between a wide-angle end state and a telephoto end state, a surface interval d4 between the first lens group G1 and the diaphragm S, a surface interval d10 between the second lens group G2 and the third lens group G3, and a surface interval d12 between the third lens group G3 and the filter FL are changed. Variable intervals in a wide-angle end state (focal length f=4.41), an intermediate focal length state (focal length f=9.57), and a telephoto end state (focal length f=20.76) of each surface interval in the third numerical embodiment are shown in Table 11 together with an F-number Fno and a half angle of view ω.

TABLE 11

| f | 4.41 | 9.57 | 20.76 |
|---|---|---|---|
| Fno. | 2.91 | 4.26 | 6.04 |
| ω | 43.95 | 22.07 | 10.51 |
| d4 | 17.281 | 6.513 | 1.300 |
| d10 | 2.700 | 8.898 | 20.450 |
| d12 | 3.078 | 2.499 | 1.900 |

The focal lengths of the first lens group G1, the second lens group G2, and the third lens group G3 in the zoom lens 3 are shown in Table 12 together with the surface of each lens group which surface is closest to the object side (starting surface).

TABLE 12

| | Starting Surface | Focal Length |
|---|---|---|
| 1st Group | 1 | −12.869 |
| 2nd Group | 5 | 9.915 |
| 3rd Group | 11 | 17.973 |

Figure 12:
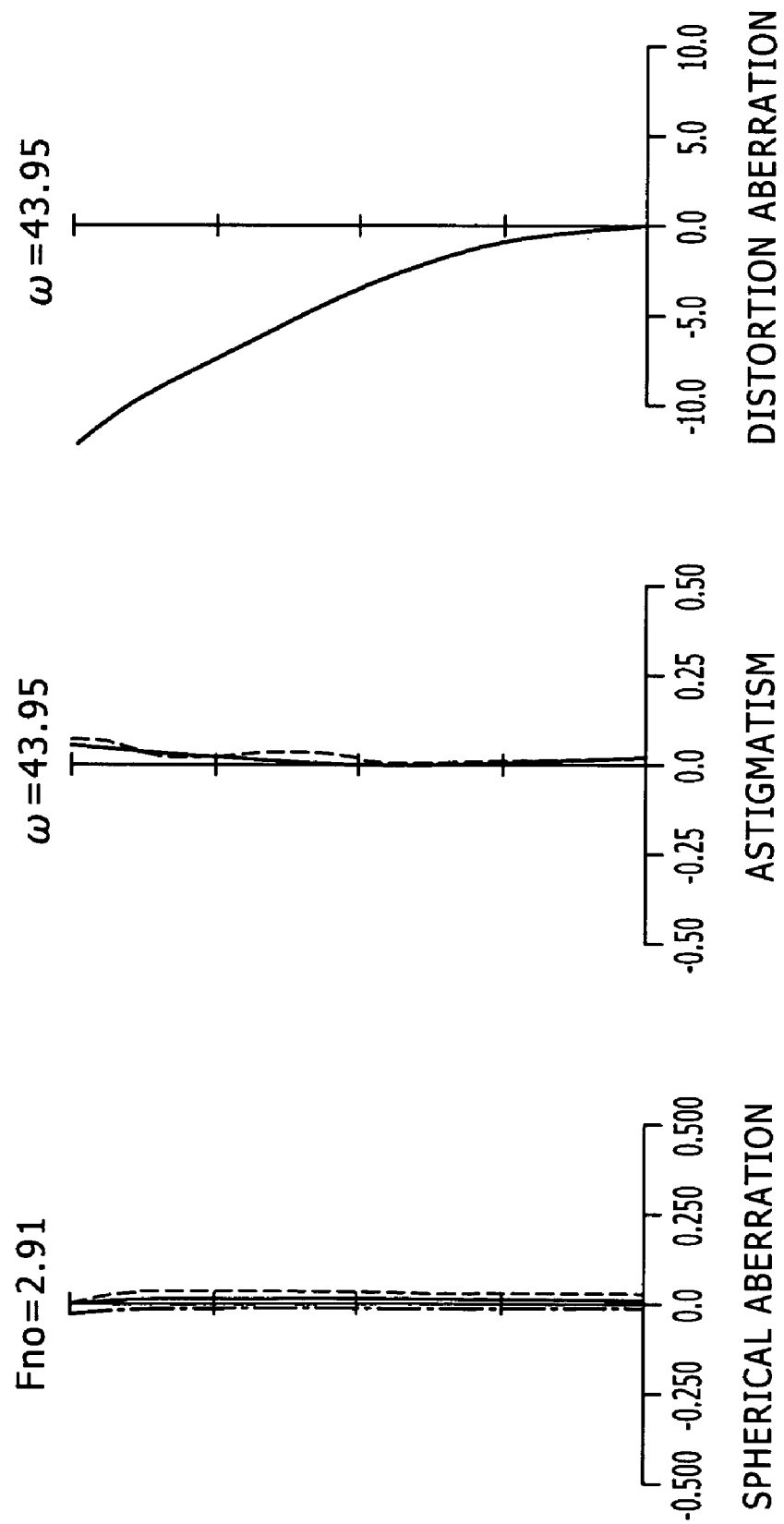
FIG. 12 is a diagram showing aberrations of a numerical embodiment in which concrete numerical values are applied to the third embodiment together with FIG. 13 and FIG. 14, FIG. 12 being a diagram showing spherical aberration, astigmatism, and distortion aberration in a wide-angle end state.
Figure 13:
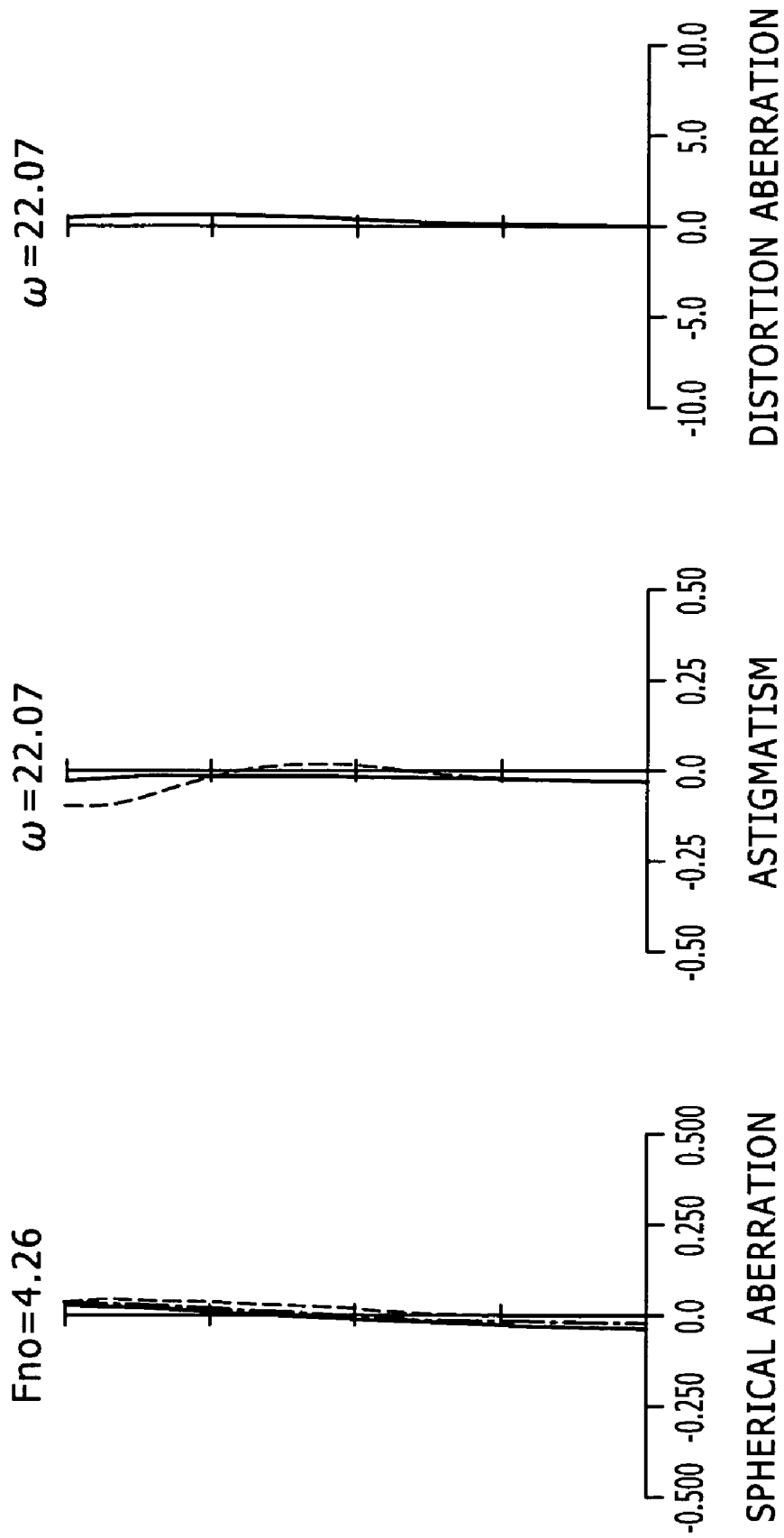
FIG. 13 is a diagram showing spherical aberration, astigmatism, and distortion aberration in an intermediate focal length state.
Figure 14:
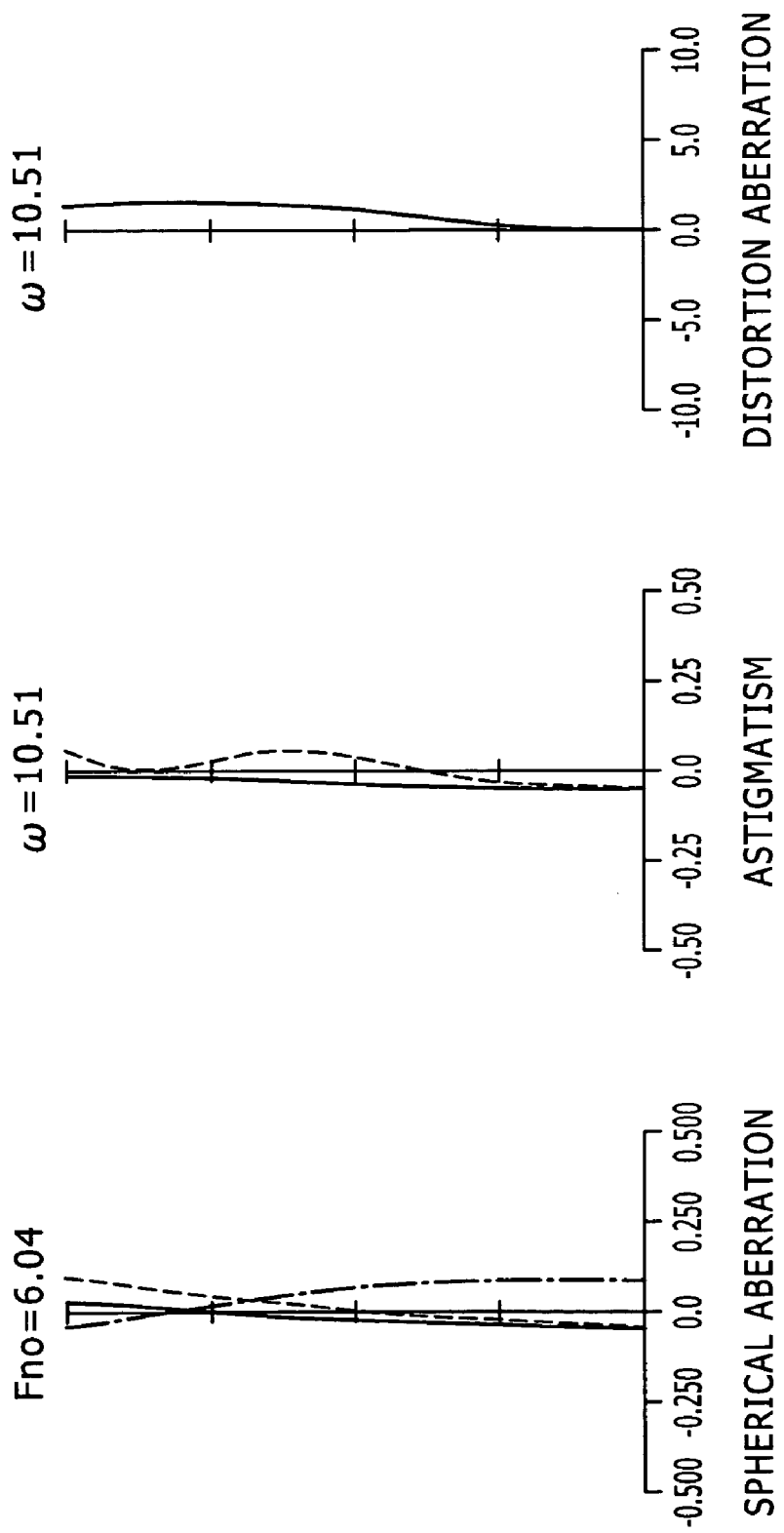
FIG. 14 is a diagram showing spherical aberration, astigmatism, and distortion aberration in a telephoto end state.

FIGS. 12 to 14 are diagrams of various aberrations in an infinity in-focus state in the third numerical embodiment. FIG. 12 is a diagram of various aberrations in the wide-angle end state (focal length f=4.41). FIG. 13 is a diagram of various aberrations in the intermediate focal length state (focal length f=9.57). FIG. 14 is a diagram of various aberrations in the telephoto end state (focal length f=20.76).

In the diagrams of spherical aberrations shown in FIGS. 12 to 14, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 12 to 14, a value in a sagittal image surface is shown by a solid line, and a value in a meridional image surface is shown by a broken line.

It is clear from each aberration diagram that the third numerical embodiment favorably corrects various aberrations and has excellent image forming performance.

TABLE 10

| i | K | A4 | A6 | A8 | A10 |
|---|---|---|---|---|---|
| 1 | 0.0000E+00 | −2.8220E−04 | 1.4656E−05 | −2.7765E−07 | 1.9302E−09 |
| 2 | 0.0000E+00 | −4.4475E−04 | −9.8666E−06 | 5.0452E−07 | −1.6057E−08 |
| 3 | 0.0000E+00 | 9.0171E−05 | −1.1311E−05 | 2.0741E−07 | 0.0000E+00 |
| 6 | 7.0493E−01 | −1.5239E−03 | −2.2633E−05 | −6.7622E−06 | 3.9616E−07 |
| 7 | −2.0000E+01 | 1.8609E−04 | 1.6987E−05 | −6.0053E−06 | 7.2228E−07 |
| 11 | −2.0006E+01 | 4.6835E−04 | −2.8527E−05 | 1.9644E−06 | 2.2450E−08 |
| 12 | 3.4419E+00 | 1.4612E−03 | −1.9691E−05 | −4.9930E−07 | 1.5129E−07 |

Figure 15:
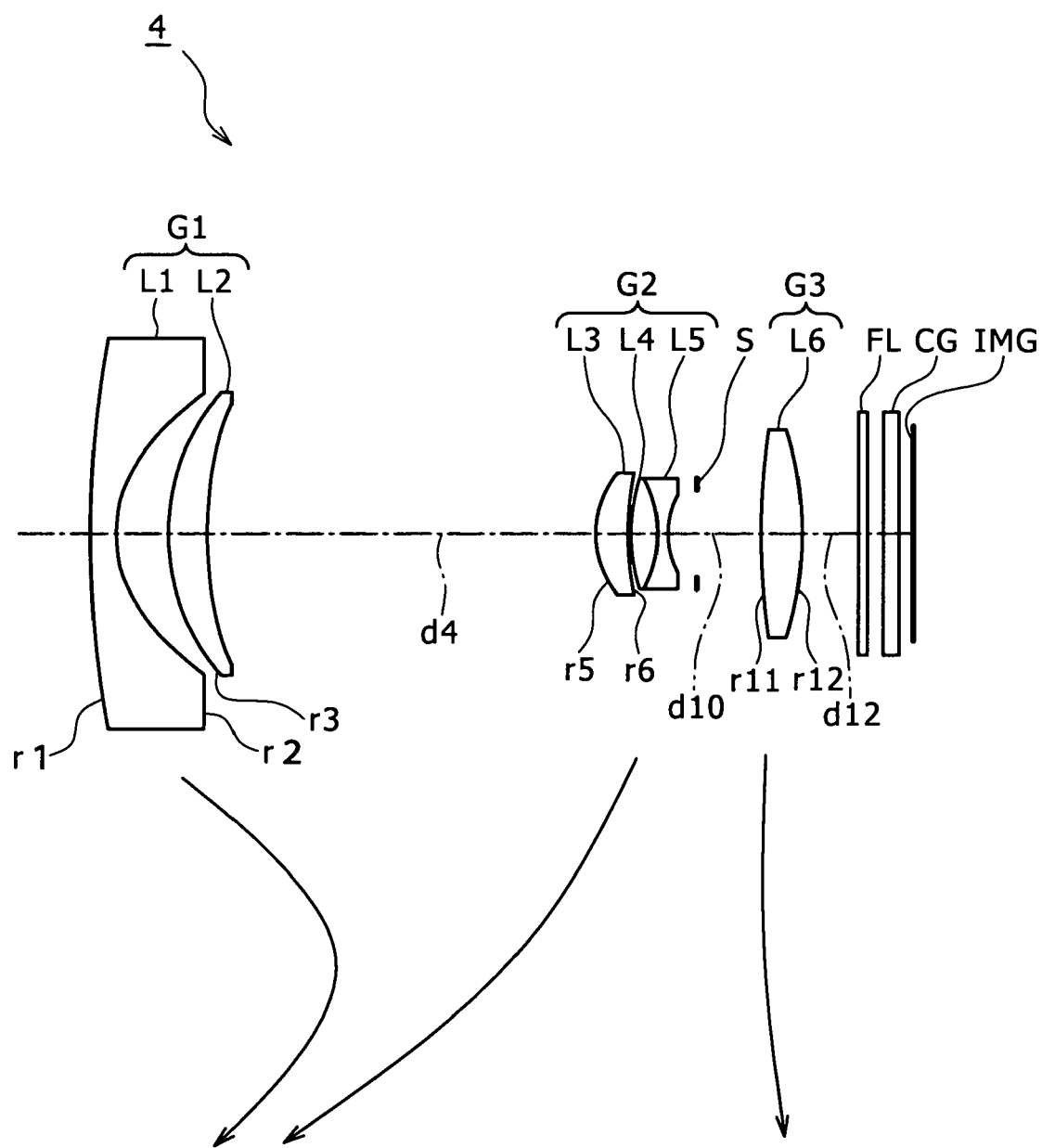
FIG. 15 is a diagram showing the lens configuration of a fourth embodiment of the zoom lens according to the present invention.

FIG. 15 is a diagram showing the lens configuration of a zoom lens 4 according to a fourth embodiment of the present invention.

The zoom lens 4 according to the fourth embodiment has six lenses, as shown in FIG. 15.

The zoom lens 4 is formed by arranging a first lens group G1 having a negative refractive power, a second lens group G2 having a positive refractive power, and a third lens group G3 having a positive refractive power in order from an object side to an image side.

The first lens group G1 is formed by arranging a first lens L1 as a negative meniscus lens having both surfaces formed as aspheric surfaces and having a convex surface facing the object side and a second lens L2 as a positive meniscus lens having a surface on the object side formed as an aspheric surface and having a convex surface facing the object side in order from the object side to the image side.

The second lens group G2 is formed by arranging a third lens L3 as a positive meniscus lens having both surfaces formed as aspheric surfaces and having a convex surface facing the object side and a cemented lens formed by joining together a fourth lens L4 as a double-convex lens and a fifth lens L5 as a double-concave lens in order from the object side to the image side.

The third lens group G3 is formed by arranging a sixth lens L6 as a double-convex lens having both surfaces formed as aspheric surfaces.

A diaphragm S (diaphragm surface r10) is disposed between the second lens group G2 and the third lens group G3.

A filter FL and a cover glass CG are arranged in order from the object side to the image side between the third lens group G3 and an image surface IMG.

Table 13 shows lens data of a fourth numerical embodiment in which concrete numerical values are applied to the zoom lens 4 according to the fourth embodiment.

TABLE 13

| si | ri | ASP | di | ni | vi |
|---|---|---|---|---|---|
| 1 | 26.948 | ASP | 1.015 | 1.85135 | 40.10 |
| 2 | 5.025 | ASP | 2.078 | | |
| 3 | 9.0285 | ASP | 1.467 | 2.00178 | 19.30 |
| 4 | 14.4948 | | variable | | |
| 5 | 4.0110 | ASP | 1.270 | 1.58313 | 59.46 |
| 6 | 36.995 | ASP | 0.150 | | |
| 7 | 7.837 | | 0.980 | 1.88300 | 40.81 |
| 8 | −4.800 | | 0.400 | 1.68893 | 31.16 |
| 9 | 3.171 | | 0.600 | | |
| 10 (diaphragm) | INFINITY | | variable | | |
| 11 | 29.633 | ASP | 1.479 | 1.55332 | 71.68 |
| 12 | −12.459 | ASP | variable | | |
| 13 | INFINITY | | 0.300 | 1.51680 | 64.20 |
| 14 | INFINITY | | 0.720 | | |
| 15 | INFINITY | | 0.500 | 1.56883 | 56.04 |
| 16 | INFINITY | | 0.600 | | |
| IMG | INFINITY | | | | |

In the zoom lens 4, the surface (r1) on the object side of the first lens L1 of the first lens group G1, the surface (r2) on the image side of the first lens L1 of the first lens group G1, the surface (r3) on the object side of the second lens L2 of the first lens group G1, the surface (r5) on the object side of the third lens L3 of the second lens group G2, the surface (r6) on the image side of the third lens L3 of the second lens group G2, the surface (r11) on the object side of the sixth lens L6 of the third lens group G3, and the surface (r12) on the image side of the sixth lens L6 of the third lens group G3 are formed as aspheric surfaces. The 4th-order, 6th-order, 8th-order, and 10th-order aspheric coefficients A4, A6, A8, and A10 of the aspheric surfaces in the fourth numerical embodiment are shown in Table 14 together with the conic constant K.

TABLE 14

| i | K | A4 | A6 | A8 | A10 |
|---|---|---|---|---|---|
| 1 | 0.0000E+00 | −2.7397E−04 | 4.4618E−06 | −3.7692E−08 | 1.4890E−10 |
| 2 | −8.6542E−01 | 9.1960E−05 | −8.6551E−07 | −7.3756E−08 | 7.9203E−09 |
| 3 | −1.5887E−01 | 1.4068E−04 | −5.8178E−06 | 9.1772E−08 | 1.4014E−09 |
| 5 | 9.7096E−01 | −1.8229E−03 | 1.4076E−04 | −3.7792E−05 | 5.3775E−06 |
| 6 | −6.9599E+02 | 5.3952E−03 | 2.2720E−04 | −1.6646E−06 | 1.5814E−05 |
| 11 | 0.0000E+00 | 7.6005E−04 | −6.1201E−05 | 8.3076E−07 | 5.6145E−26 |
| 12 | 0.0000E+00 | 1.7300E−03 | −1.0262E−04 | 1.9453E−06 | −1.0767E−08 |

In the zoom lens 4, at a time of varying power between a wide-angle end state and a telephoto end state, a surface interval d4 between the first lens group G1 and the second lens group G2, a surface interval d10 between the diaphragm S and the third lens group G3, and a surface interval d12 between the third lens group G3 and the filter FL are changed. Variable intervals in a wide-angle end state (focal length f=4.08), an intermediate focal length state (focal length f=8.46), and a telephoto end state (focal length f=17.50) of each surface interval in the fourth numerical embodiment are shown in Table 15 together with an F-number Fno and a half angle of view ω.

TABLE 15

| f | 4.08 | 8.46 | 17.50 |
|---|---|---|---|
| Fno | 2.83 | 4.07 | 5.95 |
| ω | 45.08 | 25.79 | 13.16 |
| d4 | 15.200 | 4.734 | 0.300 |
| d10 | 3.038 | 7.144 | 16.910 |
| d12 | 2.255 | 2.563 | 1.700 |

The focal lengths of the first lens group G1, the second lens group G2, and the third lens group G3 in the zoom lens 4 are shown in Table 16 together with the surface of each lens group which surface is closest to the object side (starting surface).

TABLE 16

| | Starting Surface | Focal Length |
|---|---|---|
| 1st Group | 1 | −12.224 |
| 2nd Group | 5 | 9.054 |
| 3rd Group | 11 | 16.000 |

Figure 16:
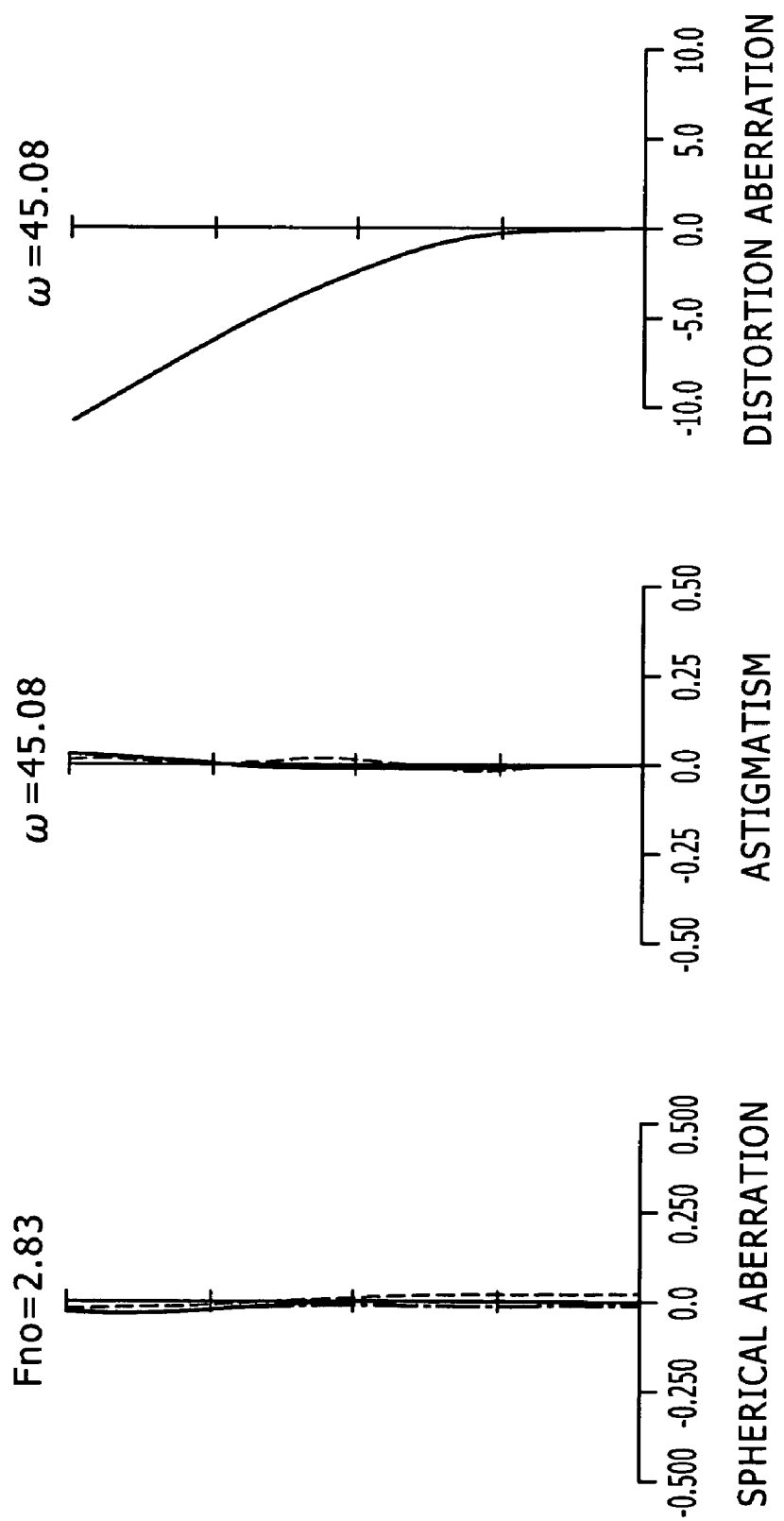
FIG. 16 is a diagram showing aberrations of a numerical embodiment in which concrete numerical values are applied to the fourth embodiment together with FIG. 17 and FIG. 18, FIG. 16 being a diagram showing spherical aberration, astigmatism, and distortion aberration in a wide-angle end state.
Figure 17:
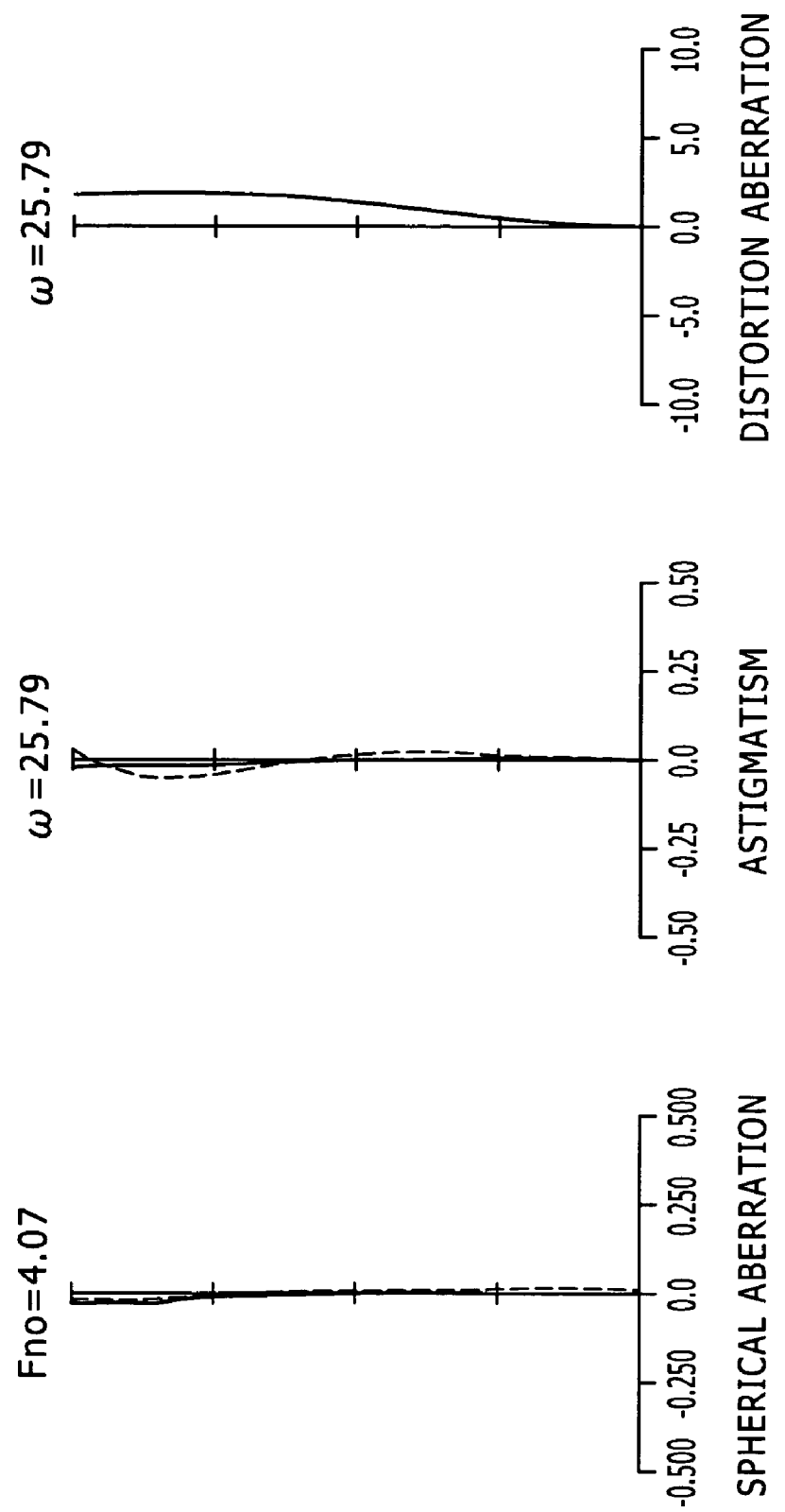
FIG. 17 is a diagram showing spherical aberration, astigmatism, and distortion aberration in an intermediate focal length state.
Figure 18:
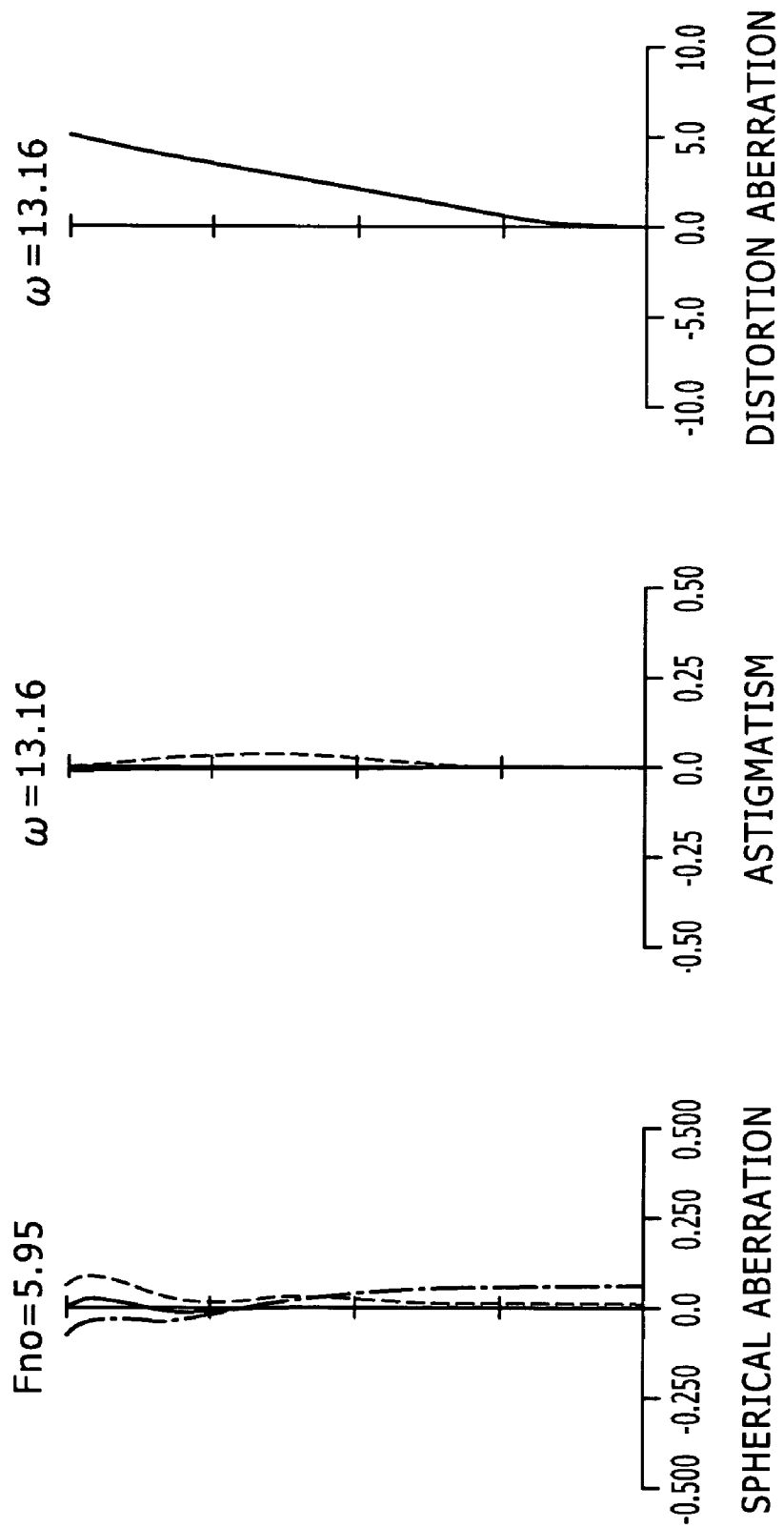
FIG. 18 is a diagram showing spherical aberration, astigmatism, and distortion aberration in a telephoto end state.

FIGS. 16 to 18 are diagrams of various aberrations in an infinity in-focus state in the fourth numerical embodiment. FIG. 16 is a diagram of various aberrations in the wide-angle end state (focal length f=4.08). FIG. 17 is a diagram of various aberrations in the intermediate focal length state (focal length f=8.46). FIG. 18 is a diagram of various aberrations in the telephoto end state (focal length f=17.50).

In the diagrams of spherical aberrations shown in FIGS. 16 to 18, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 16 to 18, a value in a sagittal image surface is shown by a solid line, and a value in a meridional image surface is shown by a broken line.

It is clear from each aberration diagram that the fourth numerical embodiment favorably corrects various aberrations and has excellent image forming performance.

Table 17 shows respective values of the above-described conditional expressions (1) to (6) in the zoom lenses 1 to 4, that is, Sgf, Sgr, ΔH, and (Sgr−Sgf)/ΔH of the conditional expression (1), f12, f1, and |f12/f1| of the conditional expression (2), t11, f12, and |f11/f12| of the conditional expression (3), D1, fw, and D1/fw of the conditional expression (4), n12 of the conditional expression (5), and v12 of the conditional expression (6).

TABLE 17

|  |  | Zoom Lens 1 | Zoom Lens 2 | Zoom Lens 3 | Zoom Lens 4 |
|---|---|---|---|---|---|
|  | Sgf | −0.834 | −0.538 | −0.664 | −1.854*1 |
|  | Sgr | 0.048 | 0.058 | −0.057 | 0.023 |
|  | ΔH | 5.0 | 5.1 | 5.5 | 5.0 |
| Conditional Expression (1) | (Sgr − Sgf)/ΔH | 0.18 | 0.12 | 0.11 | 0.38 |
|  | f12 | 19.19 | 18.53 | 20.10 | 20.80 |
|  | f1 | −11.75 | −14.10 | −12.87 | −12.22 |
| Conditional Expression (2) | |f12/f1| | 1.63 | 1.31 | 1.56 | 1.70 |
|  | f11 | −7.00 | −7.64 | −7.59 | −7.37 |
| Conditional Expression (3) | |f11/f12| | 0.36 | 0.41 | 0.38 | 0.35 |
|  | D1 | 4.35 | 3.97 | 4.43 | 4.56 |
|  | fw | 4.41 | 5.10 | 4.41 | 4.08 |
| Conditional Expression (4) | D1/fw | 0.99 | 0.78 | 1.00 | 1.12 |
| Conditional Expression (5) | n12 | 2.00 | 2.00 | 2.00 | 2.00 |
| Conditional Expression (6) | v12 | 19.3 | 19.3 | 19.3 | 19.3 |

*1As for Sgf of the zoom lens 4, the paraxial curvature height of the surface on the image side of the first lens of the first lens group the amount of sag of the spherical surface of which can be calculated is calculated as an effective diameter.

Incidentally, in Table 17, as for Sgf of the zoom lens 4, the paraxial curvature height of the surface number r2 the amount of sag of the spherical surface of which can be calculated is calculated as an effective diameter.

As is clear from Table 17, the zoom lenses 1 to 4 satisfy the above-described conditional expressions (1) to (6).

Description will next be made of an image pickup device according to an embodiment of the present invention.

The image pickup device according to the embodiment of the present invention includes a zoom lens and an image pickup element for converting an optical image formed by the zoom lens into an electric signal.

The zoom lens provided in the image pickup device is formed by arranging a first lens group having a negative refractive power, a second lens group having a positive refractive power, and a third lens group having a positive refractive power in order from an object side to an image side.

In the zoom lens provided in the image pickup device, at a time of varying power from a wide-angle end to a telephoto end, the first lens group is moved and the second lens group is moved to the object side integrally with a diaphragm such that an air interval between the first lens group and the second lens group is decreased and such that an air interval between the second lens group and the third lens group is increased.

In the zoom lens provided in the image pickup device, the first lens group is formed by arranging a first lens as a negative lens having both surfaces formed as aspheric surfaces and having a concave surface facing the image side and a second lens as a positive meniscus lens having a surface on the object side formed as an aspheric surface and having a convex surface facing the object side in order from the object side to the image side.

Because both surfaces of the first lens of the first lens group of the zoom lens are formed as aspheric surfaces as described above, the image pickup device according to the embodiment of the present invention can correct negative distortion aberration and field curvature that occur noticeably at a wide-angle end when an angle of view is widened.

In addition, because a surface on the object side of the second lens of the first lens group is formed as an aspheric surface, distortion aberration and astigmatism at the wide-angle end, which cannot be completely corrected by the first lens, can be corrected in a well-balanced manner. In addition, spherical aberration at the telephoto end which aberration occurs when a variable power ratio is increased can be corrected favorably.

Thus, because the first lens group of the zoom lens is formed by the two lenses and both surfaces of the first lens and a surface on the object side of the second lens are formed as aspheric surfaces, the image pickup device according to the embodiment of the present invention can be reduced in size and ensure high optical performance with a wider angle of view and a higher variable power.

In particular, total length of the zoom lens provided in the image pickup device according to the embodiment of the present invention can be shortened at a time of being collapsed when the zoom lens is applied to a collapsible image pickup device of a type having a lens barrel that extends and contracts.

Incidentally, in the image pickup device according to one embodiment of the present invention, it is preferable to correct distortion aberration that occurs in the zoom lens by image processing so that the image pickup device can be further reduced in size and have a higher variable power.

Figure 19:
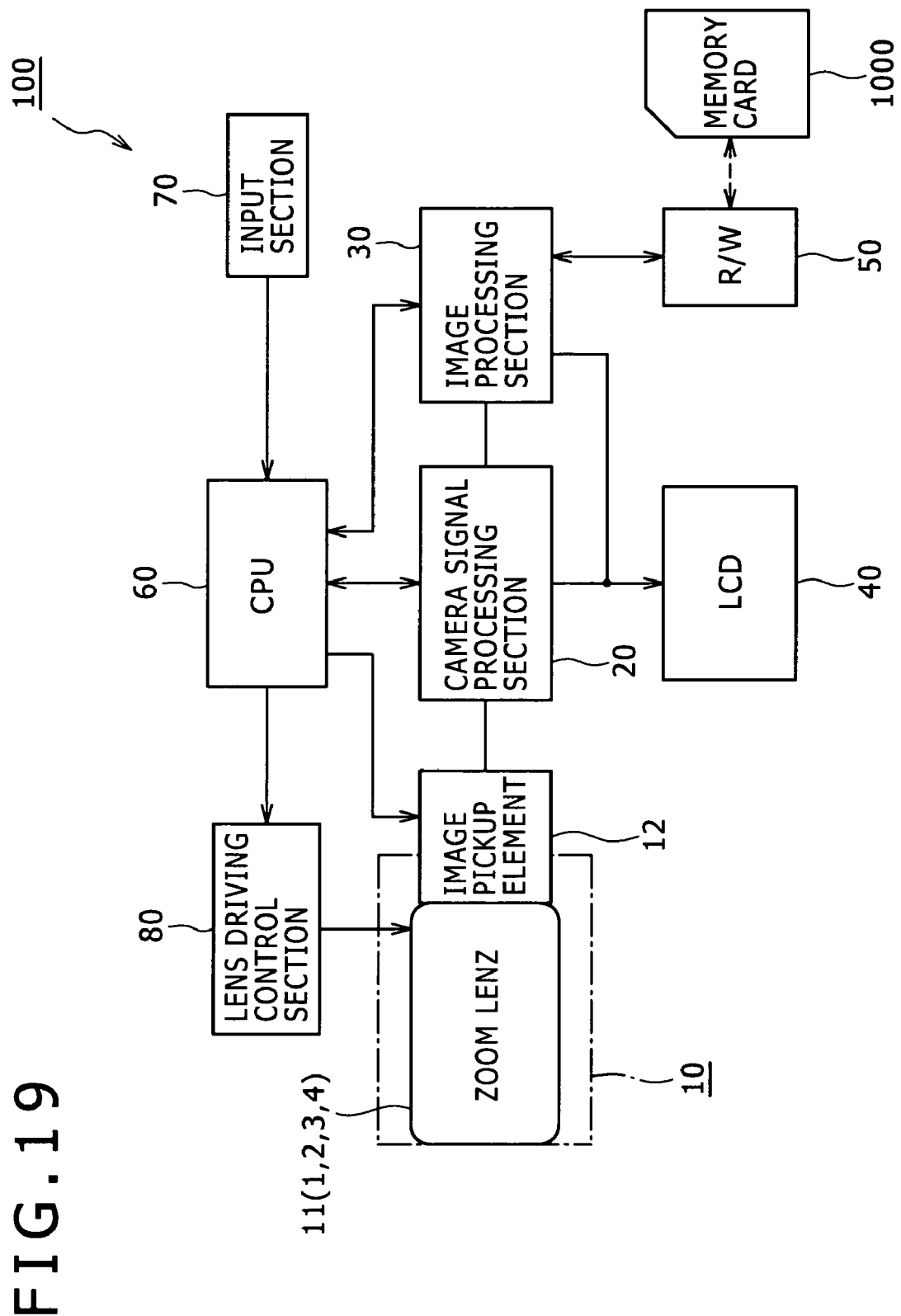
FIG. 19 is a block diagram showing an embodiment of the image pickup device according to the present invention.

FIG. 19 is a block diagram of a digital still camera in accordance with one embodiment of an image pickup device according to the present invention.

An image pickup device (digital still camera) 100 includes: a camera block 10 configured to perform an image pickup function; a camera signal processing section 20 configured to perform signal processing such as analog-to-digital conversion and the like on a taken image signal; an image processing section 30 configured to record and reproduce the image signal; an LCD (liquid crystal display) 40 for displaying a taken image and the like; an R/W (Reader/Writer) 50 configured to write the image signal to a memory card 1000 and to read the image signal; a CPU (Central Processing Unit) 60 configured to control the whole of the image pickup device; an input section 70 composed of various switches and the like on which a necessary operation is performed by a user; and a lens driving control section 80 configured to control the driving of lenses disposed in the camera block 10.

The camera block 10 includes for example an optical system including a zoom lens 11 (zoom lens 1, 2, 3, or 4 to which each of the embodiments of the present invention is applied) and an image pickup element 12 such as a CCD (Charge Coupled Device), a CMOS (Complementary Metal Oxide Semiconductor) image pickup element or the like.

The camera signal processing section 20 performs various signal processing such as conversion of an output signal from the image pickup element 12 into a digital signal, noise removal, image quality correction, conversion to a luminance and a color-difference signal, and the like.

The image processing section 30 performs a process of compression coding and expansion decoding of an image signal on the basis of a predetermined image data format, a process of converting resolution and other data specifications, and the like.

The LCD 40 has a function of displaying a state of operation on the input section 70 by a user and various data such as a taken image and the like.

The R/W 50 writes image data coded by the image processing section 30 to the memory card 1000 and reads image data recoded on the memory card 1000.

The CPU 60 functions as a control processing section for controlling each circuit block provided in the image pickup device 100. The CPU 60 controls each circuit block on the basis of an instruction input signal from the input section 70 and the like.

The input section 70 is for example formed by a shutter release button for performing a shutter operation, a selector switch for selecting an operation mode, and the like. The input section 70 outputs an instruction input signal corresponding to an operation by a user to the CPU 60.

The lens driving control section 80 controls for example a motor not shown in the figure for driving each lens of the zoom lens 11 on the basis of a control signal from the CPU 60.

The memory card 1000 is for example a semiconductor memory detachable from a slot connected to the R/W 50.

Operation in the image pickup device 100 will be described in the following.

In a standby state for picture taking, under control of the CPU 60, an image signal taken in the camera block 10 is output to the LCD 40 via the camera signal processing section 20, and is displayed as a camera-through image. When an instruction input signal for zooming is input from the input section 70, the CPU 60 outputs a control signal to the lens driving control section 80, and a predetermined lens of the zoom lens 11 is moved under control of the lens driving control section 80.

When a shutter not shown in the figure in the camera block 10 is operated by an instruction input signal from the input section 70, a taken image signal is output from the camera signal processing section 20 to the image processing section 30, subjected to compression coding, and converted to digital data in a predetermined data format. The converted data is output to the R/W 50, and written to the memory card 1000.

Incidentally, focusing is performed by moving a predetermined lens of the zoom lens 11 by the lens driving control section 80 on the basis of a control signal from the CPU 60 when the shutter release button of the input section 70 is pressed halfway or pressed all the way for recording (photographing), for example.

When image data recorded on the memory card 1000 is reproduced, the predetermined image data is read from the memory card 1000 by the R/W 50 according to an operation on the input section 70, and subjected to expansion decoding by the image processing section 30. Thereafter, a reproduced image signal is output to the LCD 40, and a reproduced image is displayed.

Incidentally, while in the foregoing embodiment, an example of applying the image pickup device to a digital still camera has been shown, the scope of application of the image pickup device is not limited to the digital still camera. The image pickup device is widely applicable as for example a camera section of digital input-output devices such as a digital video camera, a portable telephone including a camera, a PDA (Personal Digital Assistant) including a camera, and the like.

The shapes and numerical values of respective parts illustrated in each of the foregoing embodiments are each a mere example of embodiment in carrying out the present invention, and the technical scope of the present invention is not to be construed in a restricted manner by these shapes and numerical values.

The present application contains subject matter related to that disclosed in Japanese Priority Patent Application JP 2008-295877 filed in the Japan Patent Office on Nov. 19, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A zoom lens extending along an optical axis and formed by arranging a first lens group having a negative refractive power, a second lens group having a positive refractive power, and a third lens group having a positive refractive power in order from an object side to an image side, wherein at a time of varying power from a wide-angle end to a telephoto end, said first lens group is moved and said second lens group is moved to the object side integrally with a diaphragm such that an air interval between said first lens group and said second lens group is decreased and such that an air interval between said second lens group and said third lens group is increased, said first lens group is formed by arranging a first lens as a negative lens having both surfaces formed as aspheric surfaces and having a concave surface facing the image side and a second lens as a positive meniscus lens having a second lens surface on the object side formed as an aspheric surface and having a convex surface facing the object side in order from the object side to the image side, the concave surface of the first lens has a central part extending radially outwardly from and axially along the optical axis and a peripheral part integrally connected to and surrounding the central part of the concave surface and extending radially outwardly therefrom and axially along the optical axis, the second lens surface of the second lens has a central part extending radially outwardly from and axially along the optical axis and a peripheral part integrally connected to and surrounding the central part of the second lens surface and extending radially outwardly therefrom and axially along the optical axis, a radius of curvature of the central part of the concave surface on the image side of the first lens is less than a radius of curvature of the central part of the second lens surface on the object side of the second lens and a radius of curvature of the peripheral part of the concave surface on an image side of the first lens is less than a radius of curvature of the peripheral part of the second lens surface on the object side of the second lens with respective center points of the radii of curvature being located on the optical axis of the zoom lens.

2. The zoom lens according to claim 1, wherein said zoom lens is formed so as to satisfy a following conditional expression (1):

$$0 < (Sgr - Sgf)/\Delta H < 0.5 \quad (1)$$

where Sgf denotes a difference between an amount of sag of a paraxial radius of curvature of the surface on the image side of said first lens and an amount of sag of an aspheric shape of the surface on the image side of said first lens in an effective diameter of the surface on the image side of said first lens, Sgr denotes a difference between an amount of sag of a paraxial radius of curvature of the surface on the object side of said second lens and an amount of sag of an aspheric shape of the surface on the object side of said second lens in an effective diameter of the surface on the object side of said second lens, and ΔH denotes the effective diameter of the surface on the object side of said second lens (height of a position of a highest light ray passing through said second lens from an optical axis).

3. The zoom lens according to claim 1, wherein said zoom lens is formed so as to satisfy a following conditional expression (2):

$$1.0 < |f12/f1| < 2.0 \quad (2)$$

where f12 denotes a focal length of the second lens, and f1 denotes a focal length of the first lens group.

4. The zoom lens according to claim 1, wherein said zoom lens is formed so as to satisfy a following conditional expression (3):

$$0.25 < |f11/f12| < 0.45 \quad (3)$$

where f11 denotes a focal length of said first lens, and f12 denotes a focal length of said second lens.

5. The zoom lens according to claim 1, wherein said zoom lens is formed so as to satisfy a following conditional expression (4):

$$0.6 < D1/fw < 1.3 \quad (4)$$

where D1 denotes a thickness of said first lens group on an optical axis, and fw denotes a focal length of an entire lens system in a state of the wide-angle end.

6. The zoom lens according to claim 1, wherein said zoom lens is formed so as to satisfy a following conditional expression (5) and a following conditional expression (6):

$$n12 > 1.90 \quad (5)$$

$$v12 < 25 \quad (6)$$

where n12 denotes an index of refraction at a d-line of the second lens, and v12 denotes an Abbe number at the d-line of the second lens.

7. The zoom lens according to claim 1, wherein said second lens group is formed by arranging a third lens as a positive lens having at least a surface on the object side formed as an aspheric surface and having a convex surface facing the object side and a cemented lens formed by joining together a fourth lens as a positive lens having a convex surface facing the object side and a fifth lens as a negative lens having a concave surface facing the image side in order from the object side to the image side.

8. An image pickup device comprising:

a zoom lens; and an image pickup element for converting an optical image formed by the zoom lens into an electric signal, wherein said zoom lens extends along an optical axis and is formed by arranging a first lens group having a negative refractive power, a second lens group having a positive refractive power, and a third lens group having a positive refractive power in order from an object side to an image side, at a time of varying power from a wide-angle end to a telephoto end, said first lens group is moved and said second lens group is moved to the object side integrally with a diaphragm such that an air interval between said first lens group and said second lens group is decreased and such that an air interval between said second lens group and said third lens group is increased, said first lens group is formed by arranging a first lens as a negative lens having both surfaces formed as aspheric surfaces and having a concave surface facing the image side and a second lens as a positive meniscus lens having a second lens surface on the object side formed as an aspheric surface and having a convex surface facing the object side in order from the object side to the image side, the concave surface of the first lens has a central part extending radially outwardly from and axially along the optical axis and a peripheral part integrally connected to and surrounding the central part of the concave surface and extending radially outwardly therefrom and axially along the optical axis, the second lens surface of the second lens has a central part extending radially outwardly from and axially along the optical axis and a peripheral part integrally connected to and surrounding the central part of the second lens surface and extending radially outwardly therefrom and axially along the optical axis, a radius of curvature of the central part of the concave surface on the image side of the first lens is less than a radius of curvature of the central part of the second lens surface on the object side of the second lens and a radius of curvature of the peripheral part of the concave surface on an image side of the first lens is less than a radius of curvature of the peripheral part of the second lens surface on the object side of the second lens with respective center points of the radii of curvature being located on the optical axis of the zoom lens.

* * * * *